United States Patent [19]

Alajajian

[11] Patent Number: 5,668,880
[45] Date of Patent: Sep. 16, 1997

[54] INTER-VEHICLE PERSONAL DATA COMMUNICATIONS DEVICE

[76] Inventor: Philip Michael Alajajian, 336 Wellman Ave., North Chelmsford, Mass. 01863

[21] Appl. No.: 373,499

[22] Filed: Jan. 17, 1995

Related U.S. Application Data

[63] Continuation of Ser. No. 95,254, Jul. 22, 1993, abandoned, which is a continuation of Ser. No. 726,699, Jul. 8, 1991, abandoned.

[51] Int. Cl.$^6$ .............................. H04L 9/00; H04B 1/69; H04B 7/216; H04J 13/02
[52] U.S. Cl. ............................. 380/49; 380/9; 380/29; 380/34; 375/200; 320/335
[58] Field of Search ...................... 375/200–210; 380/9, 28, 29, 30, 34, 49, 50; 379/58, 59, 92; 455/33.1, 54.1

[56] References Cited

U.S. PATENT DOCUMENTS

| | | | |
|---|---|---|---|
| 4,675,863 | 6/1987 | Paneth et al. | 379/59 |
| 5,016,270 | 5/1991 | Katz | 379/92 |
| 5,276,729 | 1/1994 | Higuchi et al. | 379/58 |

OTHER PUBLICATIONS

F. Jay, *IEEE Standard Dictionary of Electrical and Electronics Terms;* (ANSI/IEEE Std, 100–1984; Third Edition, 1984; p. 695).

*Primary Examiner*—Bernarr E. Gregory
*Attorney, Agent, or Firm*—Wolf, Greenfield & Sacks, P.C.

[57] ABSTRACT

A device for wireless, secure transmission of digital information signals utilizing carrier sense multiple access (CSMA) packet communications, or spread spectrum code division multiple access (CDMA) circuits, between a plurality of stations. The device is intended for use within motor vehicles. The digital information signals may be data or compressed voice signals. Each device operates using a visual network access schema under which the operator of each station manually enters, into the device keyboard, the license plate number of the Target vehicle to be contacted. The license plate number of the Target motor vehicle is used by the Sender device to identify the transmission parameters to the Target device. These parameters are the network address, data link address, frequency channel, code division multiple access (CDMA) code, and encryption key. A Target device uses its own license plate number and that of the Sender vehicle to identify the transmission parameters for delivering a response. Each device contains two receive channels; one for reception of broadcast packet messages or CDMA circuits, and the other for directed packet messages, including signalling messages for the CDMA circuits. To support broadcast messages, the use of a pseudo license plate number, or common address, is entered by the operator of the Sender device. A preferred set of broadcast addresses supports specific types of broadcasts, such as, emergency distress messages ("EBROAD"), traffic reports ("TBROAD"), or general broadcast messages ("GBROAD"). The device consists of ten major components.

20 Claims, 18 Drawing Sheets

IV-PDCD INTERNAL DESIGN

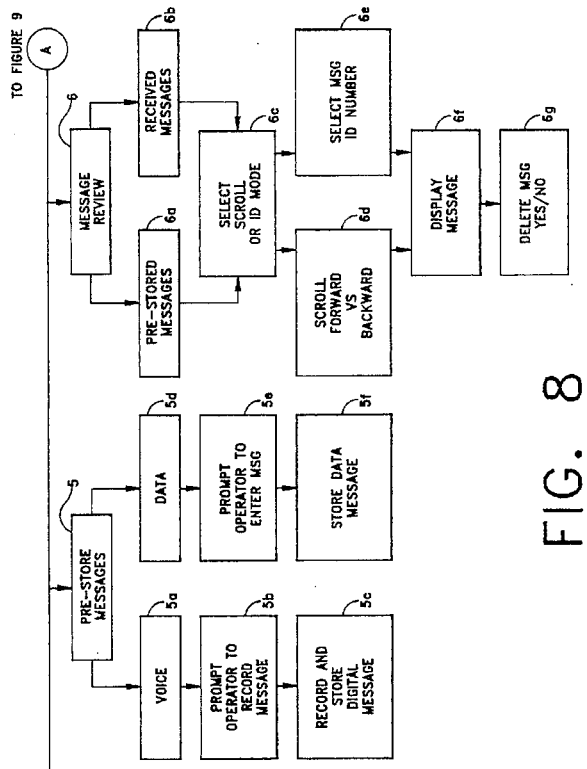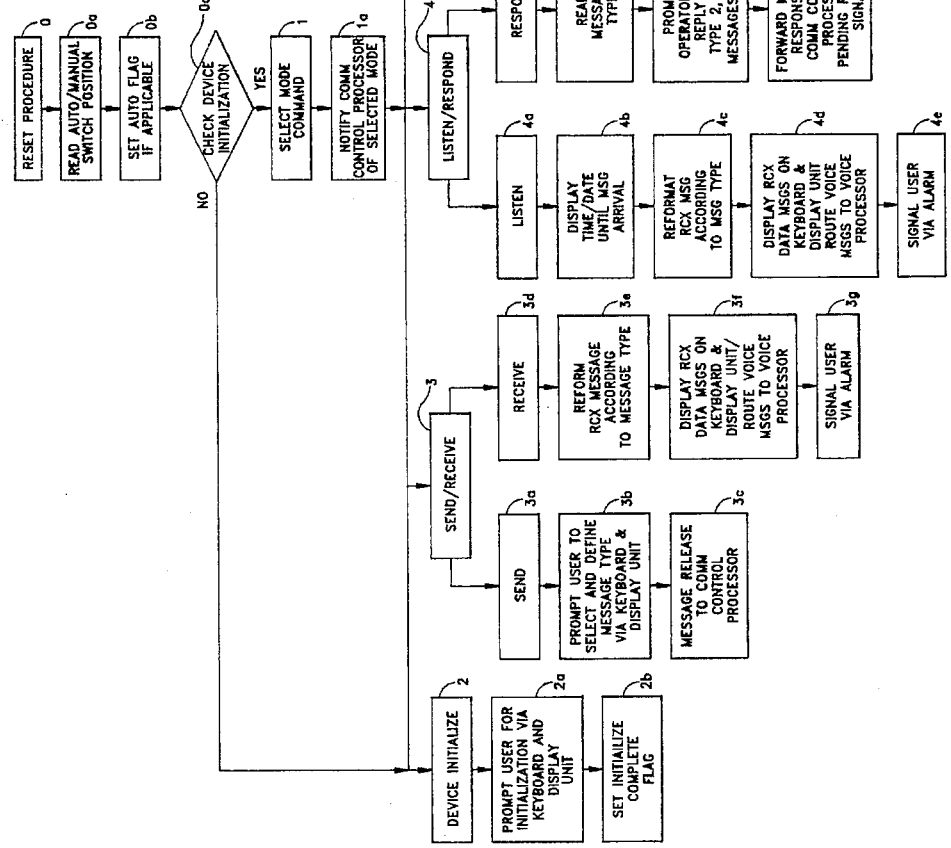
FIG. 8

MESSAGE FORMATS

MESSAGE HEADER (FOR ALL MESSAGE TYPES)

| OCTETS (1) | (2) | (6) | (6) | (1) | (1) |
|---|---|---|---|---|---|
| SOH | MSG LENGTH | TARGET LICENSE PLATE NUMBER | SENDER LICENSE PLATE NUMBER | MSG TYPE | STX |

MESSAGE PREAMBLE (FOR ALL MESSAGE TYPES)

| OCTETS (UP TO 26) | (1) | (4) | (UP TO 10) | (1) |
|---|---|---|---|---|
| VEHICLE MODEL | ETX | VEHICLE YEAR | VEHICLE COLOR | ETX |

TYPE 1 MESSAGE FORMAT

| OCTETS (17) | (UP TO 42) | (UP TO 25) | (1) | (10) | (UP TO 180) | (1) |
|---|---|---|---|---|---|---|
| MSG HEADER | MSG PREAMBLE | SENDER'S NAME | ETX | SENDER'S TELEPHONE NO. | PERSONAL MESSAGE | ETX |

TYPE 2 MESSAGE FORMAT

| OCTETS (17) | (UP TO 42) | (UP TO 180) | (1) |
|---|---|---|---|
| MSG HEADER | MSG PREAMBLE | PERSONAL MESSAGE | ETX |

TYPE 3 MESSAGE FORMAT

| OCTETS (17) | (UP TO 42) | (UP TO 180) | (1) |
|---|---|---|---|
| MSG HEADER | MSG PREAMBLE | TRAVEL DIRECTIONS REQUEST/REPLY | ETX |

TYPE 4 MESSAGE FORMAT

| OCTETS (17) | (UP TO 42) | (UP TO 12,000) | (1) |
|---|---|---|---|
| MSG HEADER | MSG PREAMBLE | PERSONAL VOICE MESSAGE | ETX |

FIG. 14

MESSAGE FORMATS

MESSAGE HEADER (FOR ALL MESSAGE TYPES)

| OCTETS (1) | (2) | (6) | (6) | (1) | (1) |
|---|---|---|---|---|---|
| SOH | MSG LENGTH | TARGET LICENSE PLATE NUMBER | SENDER LICENSE PLATE NUMBER | MSG TYPE | STX |

TYPE 5 MESSAGE FORMAT

| OCTETS (17) | (UP TO 180) | (1) |
|---|---|---|
| MSG HEADER | TRAFFIC REPORT | ETX |

TYPE 6 MESSAGE FORMAT

| OCTETS (17) | (1) | (1) |
|---|---|---|
| MSG HEADER | SIGNALLING MESSAGE | ETX |

SIGNALLING MESSAGE ENCODING

CALL SET-UP REQUEST 11110000

CALL SET-UP DENIAL 00001111

CALL SET-UP AFFIRM 01010101

CONNECTION RELEASE 11000011

RELEASE ACKNOWLEDGE 00111100

FIG. 15

DATA LINK CONTROL MESSAGE FORMATS

| 8 BITS | 8 BITS | 12345678 | 12345678 | 8 BITS *M |
|---|---|---|---|---|
| DSAP | SSAP | 0   N(S) | PF   N(R) | INFORMATION... |

LLC PROTOCOL DATA UNIT (INFORMATION TRANSFER) FORMAT

OCTETS

| 7 | 1 | 6 | 6 | 2 | PAD DATA TO 404 OCTETS | 4 |
|---|---|---|---|---|---|---|
| PREAMBLE | SFD | DESTINATION ADDRESS | SOURCE ADDRESS | LENGTH | LLC DATA   \| PAD | FRAME CHECK SEQUENCE |

MAC FRAME FORMAT

| I/G BIT | U/L BIT | 6 BIT BEDIC | 6 BIT BEDIC | 6 BIT BEDIC | 6 BIT BEDIC | 6 BIT BEDIC | 6 BIT BEDIC |
|---|---|---|---|---|---|---|---|
| | | 00 | 00 | 00 | 00 | 00 | 00 |

MAC ADDRESS FIELD FORMAT

I/G BIT = 0, INDIVIDUAL (VERSUS GROUP) ADDRESS
U/L BIT = 1, LOCALLY (VERSUS GLOBALLY) ADMINISTERED

FIG. 16

INTER-VEHICLE PERSONAL DATA COMMUNICATIONS DEVICE

This application is a continuation of 08/095,254, filed Jul. 22, 1993, now abandoned which is a continuation of application Ser. No. 07/726,699, filed Jul. 8, 1991, now abandoned.

TECHNICAL FIELD

This invention relates to two-way mobile wireless communications devices, and more specifically to an architecture for an inter-vehicle wireless local area network.

PROBLEM

In the prior art, no design exists for a practical and secure inter-vehicle wireless local area network to facilitate the exchange of data or digitally encoded voice messages by motor vehicle operators traveling in nearby proximity. Such a network would benefit users of vehicles having cellular telephones by enabling them to swap names and telephone numbers so that they could later contact one another by phone. It would also assist motor vehicle operators in exchanging travel directions, and personal data or digitally encoded voice messages while driving.

Present data communications between vehicles is achievable by several different methods. One approach is the use of synchronous digital phase- or frequency-shift keyed radio transceivers. Another approach is the use of a packet (X.25 or related) digital data radio in each vehicle. Both approaches require that the vehicle operators have some apriori schema for accessing the Target vehicle. Such schema in the former case includes knowledge of the radio frequency channel of operation, while in the latter, both the radio frequency channel and the network/data link addresses of the Target vehicle must be known beforehand.

An access schema is therefore needed to facilitate voice and data communications between vehicles when no apriori knowledge of relevant access information is available. If a wireless narrow-band carrier sense multiple access (CSMA) scheme is employed for packet communications, the method must identify the frequency channel of operation (if multiple channels have been allocated for use) and, in particular, the network/data link addresses for each vehicle. Equivalently, if a spread spectrum code division multiple access (CDMA) scheme is used to establish data or digital voice circuits, the CDMA access code must be known as well as the frequency band of operation. For secure communications, the session key for link encryption must also be identified for either type of system.

A hybrid communications system comprising all aforementioned network access information can also be envisioned which integrates a CSMA system and a CDMA system. In such a hybrid system, the CSMA portion would facilitate the exchange of short data or voice messages via packets. The CDMA portion would facilitate long term voice or data communications sessions over full-duplex circuits. This is the objective of this invention.

In addition, to enhance such a system, special application programs are needed to enable vehicle operators to efficiently exchange data such as names and telephone numbers, travel directions and personal data or voice messages.

SOLUTION

The availability of radio frequency spectrum resources is now extremely limited as the spectrum has become crowded over the years. The availability of such resources for allocation to the problem specified will drive the direction of the final implementation. The solution described herein is a hybrid CSMA/CDMA architecture. This should by no means rule out the possibility of implementing either a stand alone narrowband CSMA system, or a spread spectrum CDMA system in the event that spectrum usage is restricted. The invention described in the following document can easily be applied to either type of system as well as to the hybrid system.

An approach to providing an access schema for data (and digitally encoded voice) communications between vehicles located in close proximity has been developed and an advance made over the prior art in accordance with the principles of this invention. The invention exploits the use of motor vehicle license plate numbers to produce a visual network access schema. Such plate numbers are issued by motor vehicle registries in most Countries/States. The license plate is normally afixed to the rear, and sometimes also to the front of a vehicle. The plate(s) is also required to be illuminated for night time driving. These visibility features allow a passerby to easily and quickly read a vehicle plate number. License plate numbers are also unique for each vehicle within a given State, and therefore uniquely identify each vehicle in a State. The visibility and uniqueness features of license plate numbers makes them the perfect candidate for use in defining a visual network access schema for a vehicle, when carefully exploited.

As shown in the FIG. 1 concept diagram, the visual network access schema uses all or a portion of the license plate numbers of the Sender and Target vehicles, as entered by means of the keyboard into an Inter-Vehicle Personal Data Communications Device (IV-PDCD) by the device user, to specify the network access information to support inter-vehicle communications. This is accomplished by digital binary encoding of the entire license plate number to produce the packet network/link address, and by mappping pre-determined portions of the license plate number to customized tables to identify the other communications parameters. For packet communications the following information is provided: 1) the network and data link addresses, 2) the session keys for link encryption, and 3) the frequency channels of operation. For circuit communications the following information is provided: 1) the session keys for link encryption, 2) the frequency band of operation, and 3) the code division multiple access (CDMA) codes. Packet message broadcasting is also supported by the use of pre-specified pseudo license plate numbers with the visual network access schema as described below. In all, six packet message types are supported including: Type 1—Telephone Number Exchange messages, Type 2—Personal Data messages, Type 3—Digitally Encoded Voice messages, Type 4—Travel Request messages, Type 5—Traffic Reports, and Type 6—Circuit Signalling messages.

The packet network and data link address used is a binary representation of the license plate number. (The State or Province by which the plate is issued can be ignored since the likelihood of two identical license plates of different State (or Province) origins being found in the same location is highly unlikely.) As few as six bits can be used to represent each character of the plate number since each character can have as many as thirty-six logical states (i.e., the characters A through Z represent 26 states, while the numbers 0 through 9 represent an additional ten states, for 36 states in total). The device uses an 8-bit ASCII encoding scheme to represent network addresses. It instead uses a 6-bit BCDIC (Binary Coded Decimal Interchange Code) for representation of data link addresses for reasons described in Section 5.2.2.

For packet broadcast messages, the network/data link address to be used by all devices is the binary representation of a selected pseudo license plate number, from a family of numbers defined in such a way as to minimize the likelihood of interfering with any existing license plate numbers. The following is a preferred family of broadcast numbers: ABROAD, BBROAD, CBROAD, . . . ZBROAD, . . . 0BROAD, 1BROAD, . . . , 9BROAD. Of this "reserved" family of numbers, so far only the following numbers are being applied in this invention: CBROAD, EBROAD, GBROAD, and TBROAD. (Apologies to any vehicle operators who may have these license plate numbers.) Each device incorporates an auxilliary receiver, an auxilliary PSK demodulator, and an auxilliary CSMA/CD controller, enabling it to receive both directly addressed as well as broadcast messages, simultaneously. The use of broadcast messages is described in Section 4.1.1.2.

The session key for link encryption is selected by using all or a prespecified portion of the Target vehicle license plate number to choose a key by one to one mapping to an entry in a pre-stored table of keys. The mapping is determined by first converting the Base 36 number represented by the (prespecified portion of the) license plate number to a decimal number, and then performing a table look-up for the entry corresponding to that decimal number. A selection from a set of as many as $36^6$ encryption keys may be accomodated using this approach. The preferred approach is to select from a table of $36^2$ keys by using the first two character positions of the license plate number only.

The CSMA frequency channel of operation, is selected by using a prespecified group of character positions from the Target vehicle license plate number to one to one map to an entry in an internal table of frequency channels. Each character position can represent up to thirty-six logical states. The mapping is determined by first converting the Base 36 number represented by the character(s) in the prespecified position(s) of the license plate number to a decimal number, and then performing a table look-up for an entry corresponding to that decimal number. The internal table contains the complete set of allocated CSMA frequency channels. (If 36 or fewer frequency channels are allocated then a single character position is sufficient for the mapping; the allocated frequency channels will be duplicated as uniformly as possible to fill out thirty-six locations in the table.) The same approach can be used for selecting among a group of CDMA frequency bands. Likewise, this approach can be used to select a CDMA code for establishing a circuit. In the limiting case, the entire license plate number field of six characters could be used to select the appropriate CDMA code from among $36^6$ tabulated CDMA code variables.

In addition, a special application program is provided to enable vehicle operators to compose and efficiently exchange data such as names and telephone numbers, travel directions and personal data or voice messages.

GENERAL DESCRIPTION

The Detailed Description of this specification is a description of an exemplary device that incorporates the present invention. Such a device as shown in FIG. 2 includes a keyboard & display unit [1], a message processor [2], a memory storage unit [3], a voice processing unit [4], a communications control processor [5], a time-of-day clock [6], an encryption unit [7], a link control unit [8], a digital modem unit [9], an RF unit [10], and a power supply [11]. Of these eleven components, the message processor, the communications control processor, and the link control unit are the primary subject matter claimed for the invention.

BRIEF DESCRIPTION OF THE DRAWINGS

FIG. 8 is Part I of the process flow diagram for the Message Processor of the invention;

FIG. 14 shows the message formats for packet message Types 1, 2, 3, and 4 designated for the invention;

FIG. 15 shows the message formats for packet message Types 5, and 6 designated for the invention;

FIG. 16 shows the data link control formats, for packet messages, implemented by the Link Control Processor (LLC) of the invention;

GLOSSARY OF ACRONYMS

Figure 1:
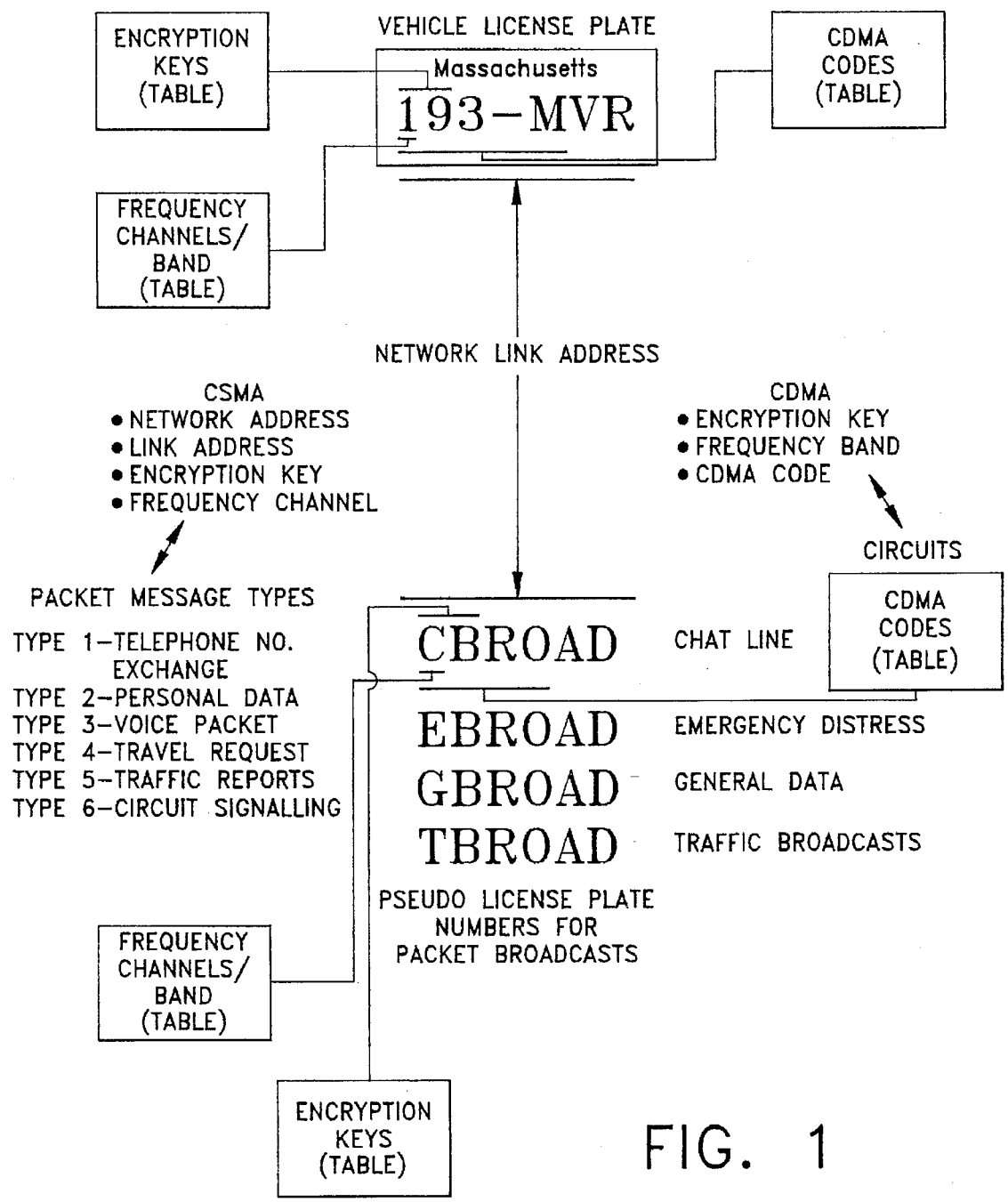
FIG. 1 is a concept diagram of the visual network access schema for mapping of license plate numbers to communications parameters for the invention.

Glossary of acronyms used in the Specification

A/D Analog to Digital
ARQ Automatic Retransmission Request
ASCII American Standard Code for Information Interchange
BCDIC Binary Coded Decimal Interchange Coding
BPS Bits Per Second
CCP Communications Control Processor
CDMA Code Division Multiple Access
CLLC Custom Logical Link Control Protocol CNLS Connectionless Service
CON Connection-Oriented Service
CSMA/CD Carrier Sense Multiple Access with Collision Detection
D/A Digital to Analog
DES Data Encryption Standard
DSAP Destination Service Access Point
DSP Digital Signal Processor
ECB Electronic Codebook (DES) Mode
EIA Electronics Industries Association
FCC Federal Communications Commission
FEC Forward Error Correction
FSK Frequency Shift Keying
HDLC High Level Data Link Control Protocol
IC Integrated Circuit
IEEE Institute for Electrical and Electronics Engineers
IF Intermediate Frequency
IV-PDCD Inter-Vehicle Personnal Data Communications Device
IV-PDCN Inter-Vehicle Personal Data Communications Network
KBPS Kilo Bits Per Second
KDU Keyboard and Display Unit
LAN Local Area Network
LBRC Low Bit Rate Codec
LLC Logical Link Control Protocol
MAC Media Access Control Protocol
MODEM Modulator/Demodulator
MP Message Processor
PCM Pulse Code Modulation
PSK Phase Shift Keying
RF Radio Frequency
SDLC Synchronous Data Link Control Protocol
SSAP Source Service Access Point
TIA Telecommunications Industry Association
UHF Ultra High Frequency
VSELP Vector Sum Excited Linear Prediction

DESCRIPTION OF THE PREFERRED EMBODIMENT

1. INTRODUCTION

Local area networks are common in the workplace. They typically employ a hard medium, such as fiber optic or coaxial cable to connect a network of data terminal users or computers together. In some campus environments where it is neither cost effective nor feasible to run cable between or among buildings for small numbers of users, the use of X.25 packet radio communications is sometimes employed to connect user nodes. It is also possible to construct a wireless local area network using Ethernet (or a similar protocol) to accomplish the same purpose. In either case, communication between users of the service can only be accomplished with prior knowledge of the media access control (MAC) (i.e., data link) address of each user.

For communications between motor vehicles, a wireless Ethernet LAN, or equivalent, packet network would be desirable to enable short term communications between small numbers of users, closely located within signal range. Such a packet network would restrict voice communications to the store-and-forward variety, introducing time delays in message transmission. This is only tolerable for very short voice messages. For longer term communications a CDMA circuit based network is more desirable and provides real-time voice communications. The architecture for a hybrid CSMA/CDMA system combining both approaches is described herein.

To establish packet CSMA communications, a user must first possess knowledge of the CSMA frequency channel of operation. The user must then have knowledge of the network/data link addresses of the Target user for communications to finally be achieved. If encryption is used, the session key for communication with the Target system must also be known.

The data link control protocol employed for packet communications could either be connection-oriented or connectionless. However, an efficient, transaction-oriented mobile local area network is the objective, and is best achieved using a connectionless data link control protocol. A connectionless (CNLS) protocol is preferred for short messages since it does not incur the overhead of establishing and maintaining connections. It also serves to reduce the overall network congestion which limits contention and improves communications efficiency. A connection-oriented (CON) protocol is favored only for very long messages such as digitized packet voice messages. The device therefore uses a CNLS protocol for all message types except digitized voice, for which it uses a CON protocol.

By contrast with the CSMA system, to establish CDMA communications circuits a user must possess knowledge of the CDMA frequency band and the CDMA codes of operation. These circuits employ a synchronous data link control protocol for which no data link address need be specified. If encryption is employed, the session key for communication with the Target system must be known.

An inter-vehicle personal data communications device (IV-PDCD) is described which provides the necessary methodology and protocols for achieving secure (i.e., encrypted) inter-vehicle local area communications for a hybrid packet (CSMA) and circuit (CDMA) communications system. Use of the device for successful communications between vehicles mainly requires user entry of the license plate number of each vehicle to be accessed, obtained by visual means.

The device also contains special application programs to enable vehicle operators to quickly and easily exchange four different message types: Type 1: Names and Telephone numbers, Type 2: Personal data, Type 3: Travel Directions, and Type 4: Digitized Voice Messages. Additionally, it contains a special application program designed to receive and format traffic reports. These are broadcast in Type 5 message packets from a centralized terminal in a metropolitan area. The packets describe the traffic conditions in a particular region of a city and are tagged with a region identifier. The Type 5 message, shown in FIG. 15, is a minor variant of the Type 2 message described in FIG. 14. The only differences are: the value of the message type field in the header is 00101, a binary metropolitan region/regional zone identifier replaces the sender license plate number in the header, and the message preamble is eliminated. A Type 6 message is generated by the Communications Control Processor for signalling purposes only. The Type 6 message is identical to a Type 5 message with a few exceptions. The value of the message type field in the header is 00110, the actual ASCII encoded sender license plate number is used, and the message payload is only one byte in length and descriptive of the signalling message. Encoding for the various types of signalling messages is shown in FIG. 15.

Figure 2:
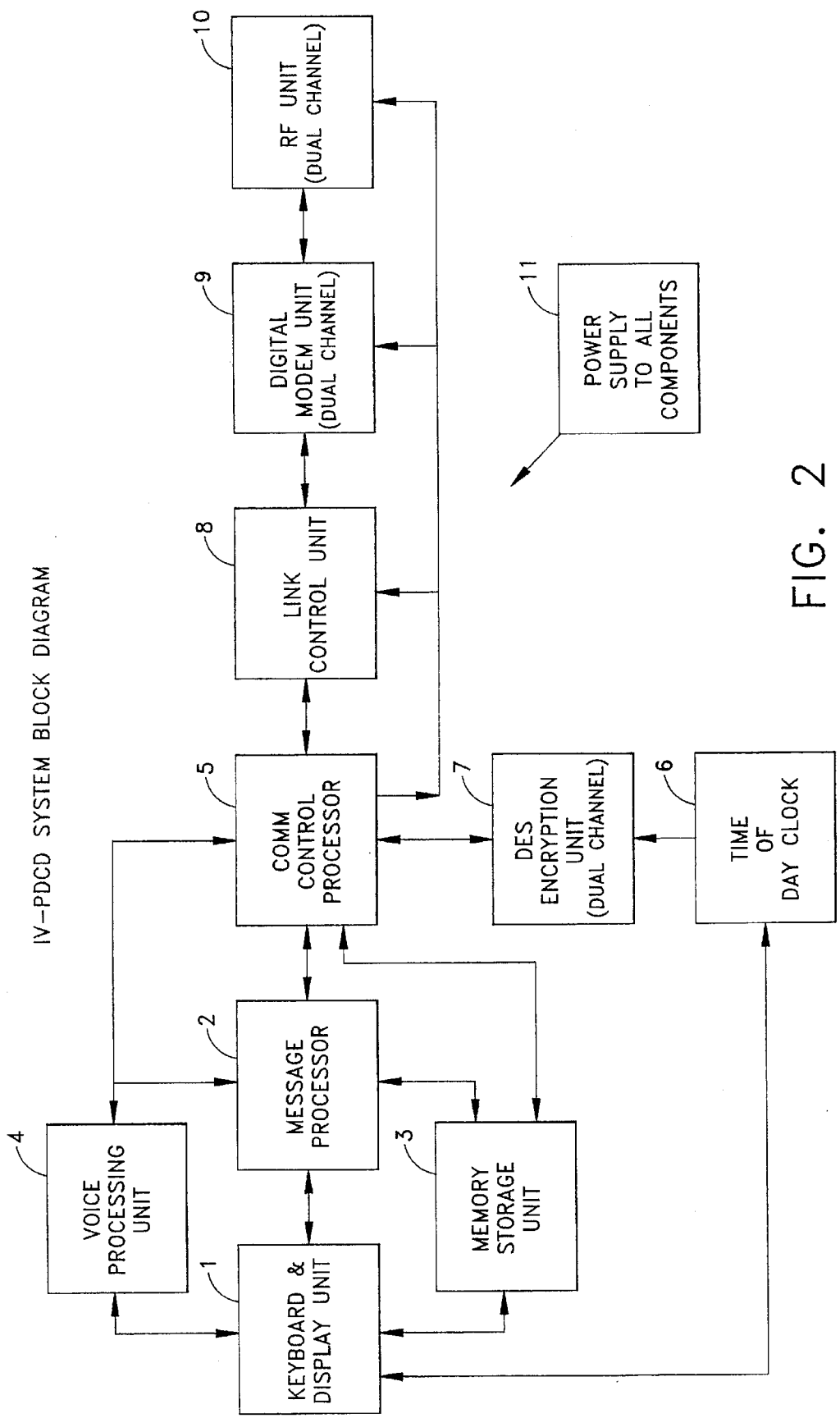
FIG. 2 is a high level system block diagram showing the relationships between the major components of the invention.

The device is a fully integrated communications system consisting of eleven major components as depected in FIG. 2: a keyboard & display unit [1], a message processor [2], a memory storage unit [3], a voice processing unit [4], a communications control processor [5], a time-of-day clock

[6], an encryption unit [7], a link control unit [8], a digital modem unit [9], an RF unit [10], and a power supply [11]. Of these eleven components, the communications control processor, the message processor, and the link control unit are the primary subject matter to be claimed for the invention.

2. TERMINOLOGY

An inter-vehicle personal data communications device (IV-PDCD) may attempt to initiate packet communications with any other IV-PDCD at any time, by acting in the SEND/RECEIVE mode. The device which initiates communication is herein referred to as the Sender Device. The device that is Targeted for communications by the Sender Device is referred to as the Target Device. The Sender Device is said to be in the Sender role, while the Target Device is said to be in the Target role, and operating in the LISTEN/RESPOND mode. These roles and modes are maintained for the complete duration of the communication. That is, the Sender Device is considered to be in the Sender role and operating in the SEND/RECEIVE mode from the time the message request is formulated, to the time a message response is received from the Target Device. Likewise, the Target Device is considered to be in the Target role and operating in the LISTEN/RESPOND mode during the same sequence of events. Operation of any two or more IV-PDCD's for inter-vehicle communication constitutes an inter-vehicle personal data communication network (IV-PDCN).

3. COMMUNICATIONS HARDWARE ARCHITECTURE

The Inter-Vehicle Personal Data Communications Device comprises a hybrid network communications architecture. It contains both a carrier sense multiple access (CSMA) packet communications system and a code division multiple access (CDMA) circuit communications system whose operations are integrated as described below. The CSMA system supports direct addressed or broadcast packet messages (data or voice), and the CDMA system supports direct addressed real-time voice or data circuit connections. The CSMA system also provides the call signalling capability for the CDMA network.

3.1 System Configuration

Hereinafter a preferred embodiment of this invention will be described with reference to the diagrams depicted in the drawing figures. FIG. 2 is an overall system configuration diagram of the Inter-Vehicle Personal Data Communications Device according to a preferred embodiment of this invention. Referring to FIG. 2, for outbound operation, the keyboard and display unit [1] provides a means for a device user to control the device via menu selections that appear on a liquid crystal display screen upon device power-up. (The screen has dimensions of approximately 3½"×3½" with a thirty-six character minimum screen width.) The menu is generated by the message processor [2]. Entries from the device user are interpreted by the keyboard and display unit processor and represented using the ASCII alphabet. The keyboard and display unit controls the location of the screen cursor. It displays input alphanumeric characters in consecutive positions on the screen. The keyboard and display unit processor stores the resultant ASCII coded input characters in the memory storage unit [3] for processing by the message processor. Control signalling between the two processors is conducted via interrupt control lines.

The message processor [2] reorganizes and transfers outgoing message contents to the communications control processor [5] via the memory storage unit. In the event that the digitally encoded voice packet mode is selected, the message processor controls and coordinates with the voice processing unit [4] to receive a digitally encoded voice message, storing the result in the memory storage unit. The voice processing unit converts analog voice signals received from a microphone, within the device housing, into digitally encoded voice messages commensurate with the EIA/TIA IS-54 standard.

The communications control processor formats the message contents received from the memory storage unit, into an application level message frame. It also segments the message frame into 64 bit segments and coordinates with the DES encryption unit [7] to encrypt the message segments. The communications control processor then transfers the encrypted message fragments to the link control unit [8]. For the voice circuit mode, the communications control processor interfaces directly with the voice processing unit after the circuit has been established. The communications control processor has interfaces to the link control unit, the digital modem unit, and the RF unit for conveyance of communications control parameters.

The link control unit formats the encrypted message fragments into data link control frames for transfer over the data link. It also controls the transfer of data link frames and the use of the RF communications channel. The link control unit transfers a digital bit stream to the digital PSK modem unit [9]. The digital PSK modem unit uses the incoming bit stream to phase modulate an intermediate frequency (IF) signal. The resultant signal is fed to the RF unit [10]. The RF unit upconverts the IF signal to an RF frequency channel, filters any out of band signals, and provides power amplification. The operation for incoming messages follows virtually the reverse process flow through the device. The time-of-day clock [6] provides time-of-day information to the keyboard and display unit and to the DES encryption unit. The power supply [11] provides the entire device with electrical power.

3.2 Hardware Configuration

Figure 3:
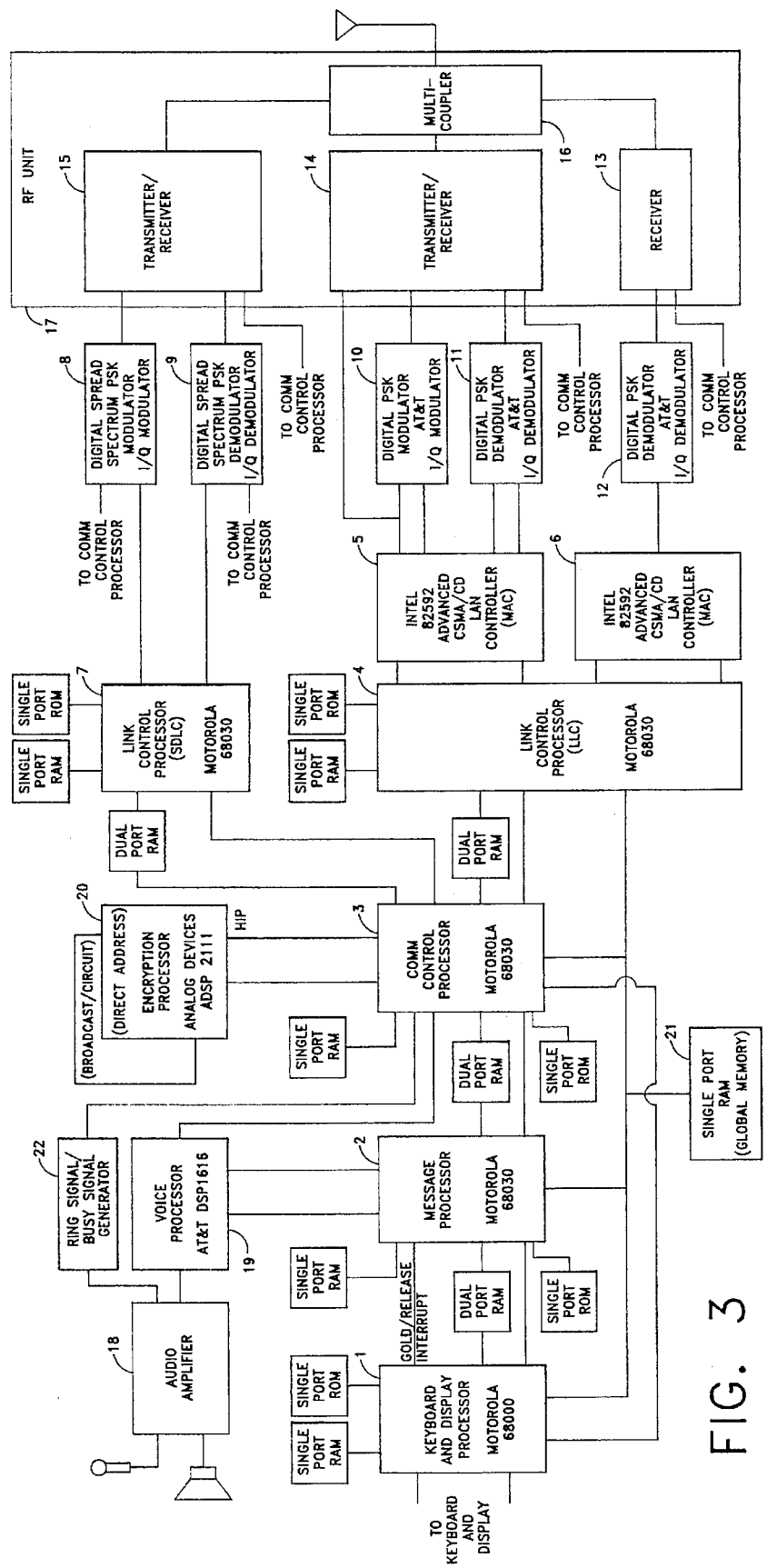
FIG. 3 shows a preferred hardware implementation for the invention.

FIG. 3 is an overall circuit configuration diagram for the Inter-Vehicle Personal Data Communications Device according to a preferred embodiment of the invention. The device consists primarily of several high speed microprocessors and digital signal processors, and memory devices. Each microprocessor is supported by at least one single port RAM and one single port ROM memory device. The interface to each memory device consists of address lines, data lines and control lines. Collectively, all of the shared memory devices in FIG. 3 comprise the memory storage unit [3] depicted in FIG. 2. In FIG. 3, the keyboard and display processor [1] and message processor [2] pair interface by means of a dual port RAM, and by interrupt control lines, as do the message processor and communications control processor [3] pair, and the communications control processor and each link control processor [4, 7] pair. In addition, these all share a common global random access memory [21] by means of a parallel address bus.

A Motorola 68030 forms the basis for each of the following: the message processor, communications control processor, and link control processors. An Intel 82592 Advanced CSMA/CD LAN controller [5], and a spare [6] for the receive broadcast channel, assist the Motorola 68030 based LLC link control processor in support of the IEEE 802 data link control standard; the 68030 programmed with modified Retix Incorporated link control software provides the IEEE 802.2 logical link control (LLC) functions; the 82592 firmware provides the IEEE 802.3 media access control (MAC) functions. The synchronous link control processor [7], for supporting real-time CDMA circuits, is a Motorola 68030 programmed with custom synchronous link control software.

The keyboard and display unit processor is based on a Motorola 68000 microprocessor. The voice processor [19] is an AT&T DSP1616 chip programmed to perform the VSELP speech-compression algorithm and error correction functions, developed by Teknektron Communications Systems Incorporated, as required in IS-54 terminals. The DSP 1616 chip interfaces with the Motorola 68030 based message processor by means of a parallel interface and interrupt lines. The DSP 1616 also interfaces with an audio amplifier [18] that provides amplification of the analog signal from a carbon microphone to the voice processor, and amplification of the analog signal from the voice processor to a loudspeaker. A ring signal/busy signal generator [22] interfaces with both the audio amplifier [18] and a control line to the communications control processor [3]. This line is activated by the communications control processor to indicate the voice circuit status during call set-up.

The DES encryption processor [20] is an Analog Devices ADSP 2111, programmed to perform the Data Encryption Standard Algorithm in the Electronic Codebook Mode (ECB). The ADSP 2111 interfaces with the Motorola 68030 based communications control processor through a parallel, Host Interface Port (HIP), interface.

The digital PSK modem, for support of packet communications, consists of an AT&T In-phase and Quadrature modulator IC [10] and an AT&T In-phase and Quadrature demodulator IC [11], with a spare demodulator IC for the receive broadcast channel [12]. The modulator input line and demodulator output line each interface with the Intel 82592 LAN controller by means of separate data and control lines. The modulator output line and demodulator input line interface with the RF unit through an intermediate frequency feed.

The digital spread spectrum modem consists of a digital spread spectrum PSK modulator [8] and a digital spread spectrum PSK demodulator [9]. Each has a control line to the communications control processor from which the appropriate CDMA code variable is received.

The RF unit [17] is comprised of a narrowband transmitter/receiver [14], and a spare broadcast channel receiver [13], and a wideband transmitter/receiver [15]. Each transmitter/receiver consists of an oscillator, several stages of high frequency mixers and filters (used to convert a PSK modulated waveform between the intermediate frequency and the selected radio frequency channel or band), and a power amplifier. Each narrowband transmitter/receiver of the RF unit receives control signals via control lines from the communications control processor and the MAC link controller. The former provides frequency channel information, and the latter media access control information. The wideband transmitter/receiver receives control signals via control lines from the communications control processor for both frequency band information and transmitter activation. For shared use of a single antenna, a multicoupler [16] is used to feed each transmitter/receiver pair, and the spare broadcast receiver.

In the preferred design, all of the components described, except the microphone and loudspeaker, will be integrated onto a single circuit board.

4. OVERVIEW OF DEVICE PROCESSOR FUNCTIONS

Prior to presenting the software architecture for the IV-PDCD, a brief overview of the major processor functions within the device will serve to clarify their purpose. In particular, a brief overview of the function of the message processor, the communications control processor, and the link control unit will follow.

4.1 Message Processor

The message processor is based on a 68030 microprocessor and provides for the following primary functions: 1) a man-machine interface, 2) device mode selection and operation, and 3) control of message composition and transfer for the six basic message types to and from the communications control processor, including receipt of Type 5 traffic report messages. These functions are implemented in software.

4.1.1 Man-Machine Interface

The message processor generates the human interface which enables an operator to select a device operational mode, and to operate the device within that mode. It does so by displaying a set of menus on the keyboard and display unit that the operator can select from, as well as a set of prompts or templates to assist in message creation. The main menu requires the operator to select one of seven modes: Initialize, Send/Receive, Listen/Respond, Set-up Circuit, Set Broadcast Receiver, Pre-Store Messages, and Message Review. A tailored set of sub-menus are provided for each mode selection as described in the following subparagraphs.

4.1.1.1 Initialize

The operator is prompted to enter information to initialize the device. The following information is solicited:

User Name:

User's Telephone Number:

Vehicle License Plate Number:

Vehicle Model:

Vehicle Color:

Vehicle Model Year:

Set Time/Date:

4.1.1.2 Send/Receive Menu

The Send/Receive menu requires the operator to select one of four sub-menus for building packet messages: Type 1, Type 2, Type 3, or Type 4. Special prompts, or a message template are created on the display unit to assist the user in building each message type. {NOTE: In order to send a broadcast packet message, rather than a person-to-person message, the operator should specify a pseudo license plate number from the family of broadcast numbers in place of a Target license plate number. All devices will be designed to recognize these broadcast addresses (but only one at a time depending on the result of the Set Broadcast Receiver Mode) in addition to their own personal direct visual network address. In particular, the broadcast address "GBROAD" should be used for the majority of broadcast messages including, Type 3, travel information requests, and Type 2 (data) or Type 4 (voice) personal messages for general conversation. The broadcast address, "CBROAD", is reserved for a chat line service, whereby operators send Type 2 personal data messages to request conversation on specific topics such as sports, politics, or music. Pending a response to such a request, the operator will normally initiate a full-duplex voice circuit to the responding party to engage conversation. The broadcast address, "EBROAD", is reserved for broadcasting emergency distress Type 2 (data) messages. These broadcasts will be monitored by police and other agencies for the purpose of aiding and assisting stranded motorists. The broadcast address, "TBROAD", is reserved centralized broadcast of metropolitan traffic reports (by regional zone using Type 5 messages) by a single device operating at higher than normal effective radiated power. All ordinary IV-PDCD's are precluded from sending messages using the traffic broadcast address by the device message processor.}

4.1.1.2.1 Type 1

Type 1 packet messages are used for the exchange of name and telephone number information between a Sender device and a Target Device. This information is prestored upon device initialization to minimize the quantity of input solicited from each device operator. The Type 1 message format shown in FIG. 14 is used for exchanging this information.

The message build menu reads as follows:

Please enter the following data:
  Target Vehicle License Plate Number
  Identify Pre-Stored Personal Message (Optional)
  Manually Enter New Personal Message (Optional)
(No optional messages are required, and no more than one may be entered)

4.1.1.2.2 Type 2

Type 2 packet messages are used for the exchange of personal data messages. The Type 2 message format shown in FIG. 14 is used for exchanging this information.

The message build menu reads as follows:

Please enter the following data:
  Target Vehicle License Plate Number
  Identify Pre-Stored Personal Message (Optional)
  Manually Enter New Personal Message (Optional)
(Only one of the optional messages must be entered)

4.1.1.2.3 Type 3

Type 3 packet messages are used for the exchange of travel information messages. The Type 3 message format shown in FIG. 14 is used for exchanging this information.

The message build menu reads as follows:

Please enter the following data:
  Target Vehicle License Plate Number
  Desired Street address (Optional)
  Desired Route/Highway/Interstate Identification (Optional)
  Name of Desired Place (Optional)
  Other Information Requested (Optional)
(Only one of the optional messages must be entered)

4.1.1.2.4 Type 4

Type 4 packet messages are used for the exchange of digital voice messages. The Type 4 message format shown in FIG. 14 is used for exchanging this information.

The message build menu reads as follows:

Please enter the following data:
  Target Vehicle License Plate Number
  Identify Pre-Stored Voice Message (Optional)
  Record Voice Message (Optional)
(Only one of the optional messages must be entered)

4.1.1.3 Listen/Respond Menu

The Listen Menu provides the following features:

Time/Date are displayed until a message is received.

Upon message receipt, the Respond Menu prompts the operator to enter a suitable reply message depending on the packet message type received. This is done by using menus which closely parallel those described for the Send/Receive menus.

4.1.1.4 Set-up Circuit

The Set-up Circuit menu permits an operator to request a CDMA circuit to a specific target vehicle. No broadcast capability is provided. The menu reads as follows:

Please enter the following data:
  Specify Traffic Type (Voice or Data)
  Target Vehicle License Plate Number A "Connection Complete" message appears on the screen once the circuit has been established. In addition, for voice traffic, audible ring signals or busy signals are sent to the handset to indicate call status.

4.1.1.5 Set Broadcast Receiver

The Set Broadcast Receiver menu permits the operator to configure the broadcast receiver for the desired broadcast address from the family of broadcast addresses and to specify any associated parameters. The menu reads as follows:

Please select one of the following receive broadcast addresses and associated parameters:
  Chat Line (CBROAD):
  Emergency Distress Messages (EBROAD):
  General Messages (GBROAD):
  Traffic Reports (TBROAD):
  Identify Metropolitan Region Code:
  Identify Regional Zone Code:

If the Set Broadcast Receiver mode is not entered, the broadcast receiver defaults to the General Messages broadcast address.

4.1.1.6 Pre-Store Messages Menu

This menu pertains to packet messages only.

The Pre-Store Menu reads as follows:

Message type (Data or Voice)?

For a Voice selection, the following prompt is given:
  Begin recording Voice Message #XYZ when Red light goes on.

For a Data selection, the following prompt is given:
  Enter Data Message #XYY

4.1.1.7 Message Review Menu

This menu pertains to packet messages only.

The Review Menu reads as follows:

Select Message Review Type
Pre-Stored Messages
Received Messages
You have "D" (Pre-stored)/(Received) messages
Scroll Mode (S)?
ID Mode (I)?

The appropriate sub-menu, Scroll Mode or ID Mode, will appear based on the selection made by the device operator.

4.1.1.7.1 Scroll Mode

Enter message number you wish to scroll from?

Scroll Forward/Backward (F/B)?

The appropriate message selection will appear based on the selection made by the device operator.

4.1.1.7.2 ID Mode

Please enter the message ID number?

The appropriate message selection will appear based on the selection made by the device operator.

4.1.2 Mode Selection

The message processor prompts the operator to select from among the following device modes: 1) Initialize, 2) Send/Receive, 3) Listen/Respond, 4) Set-up Circuit, 5) Set Broadcast Receiver, 6) Pre-Store Messages, and 7) Message Review. If mode selection by the operator is not forthcoming within thirty seconds the device defaults to the Listen/Respond mode.

4.1.2.1 Initialize

The message processor prompts the operator for information required to initialize the device including personal data and personal vehicle data. This pre-entered information greatly reduces the quantity of information required for entry by the device operator in any given mode. A limit is set on the number of initializations that can be entered by an operator over a thirty day period. This is to prevent an operator from subverting the network.

4.1.2.2 Send/Receive

This mode is used by an operator to send any of the four packet message types and to receive any responses offered by the Target device. The message processor prompts the operator for information regarding the message type selected or provides a message template. The message processor will display received messages on the display screen in the appropriate format for the message type received. The voice segment for digitally encoded voice packet messages will be forwarded to voice processing and to an audio amplifier/loudspeaker for audibility.

4.1.2.3 Listen/Respond

This mode is selected by an operator wishing to passively listen for any packet messages being sent to his/her vehicle. The message processor will display time and date information until a message arrives. Upon message arrival, the message processor will display the message on the display screen in the appropriate format for the message type received. The voice segment for digitally encoded voice messages will be forwarded to voice processing and to an audio amplifier/loudspeaker for audibility. The message processor will then prompt the operator to issue a commensurate reply.

4.1.2.3.1 Telephone Number Swap Messages

Figure 4:
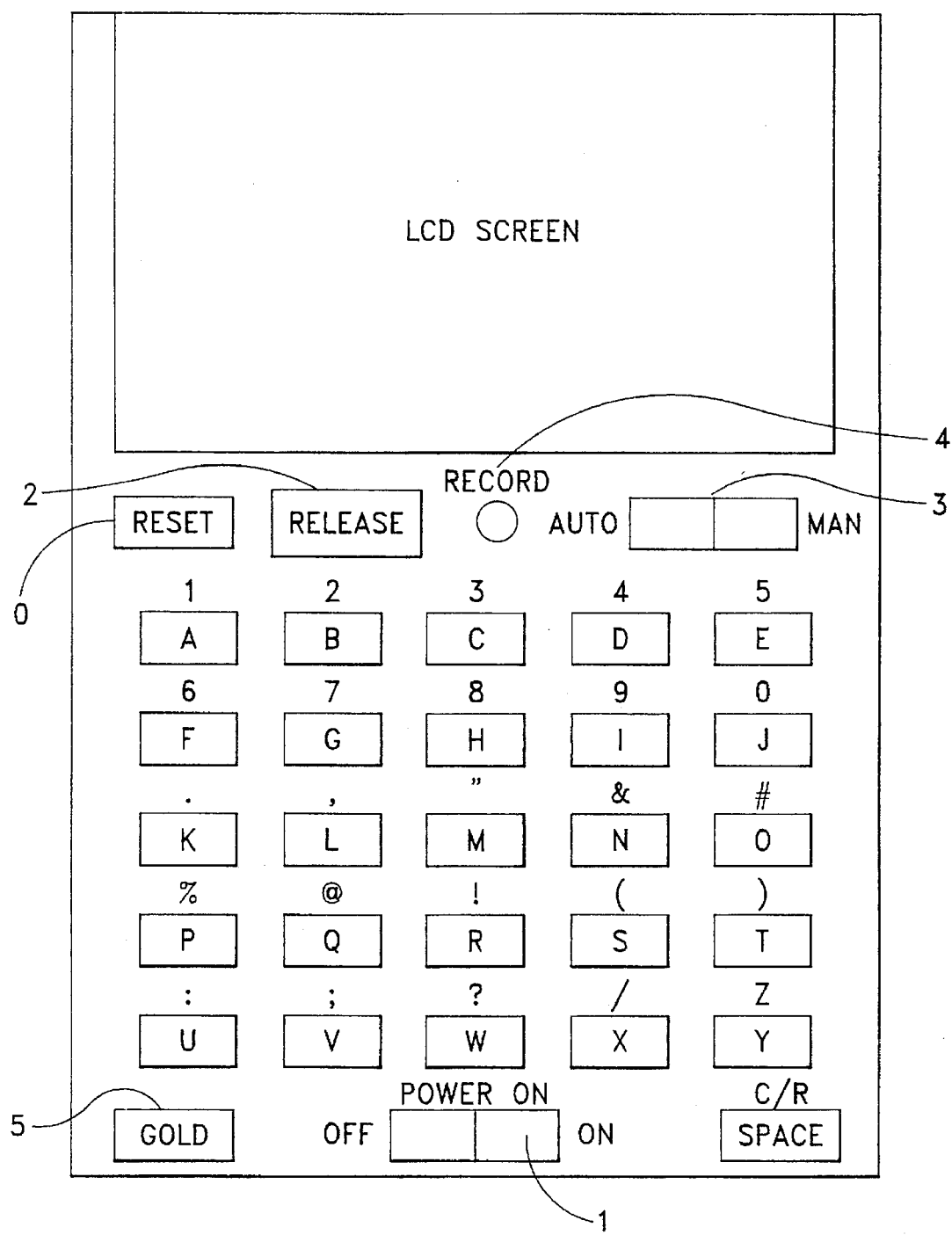
FIG. 4 is a mechanical concept diagram showing an external top view of the invention for one implementation.
Figure 5:
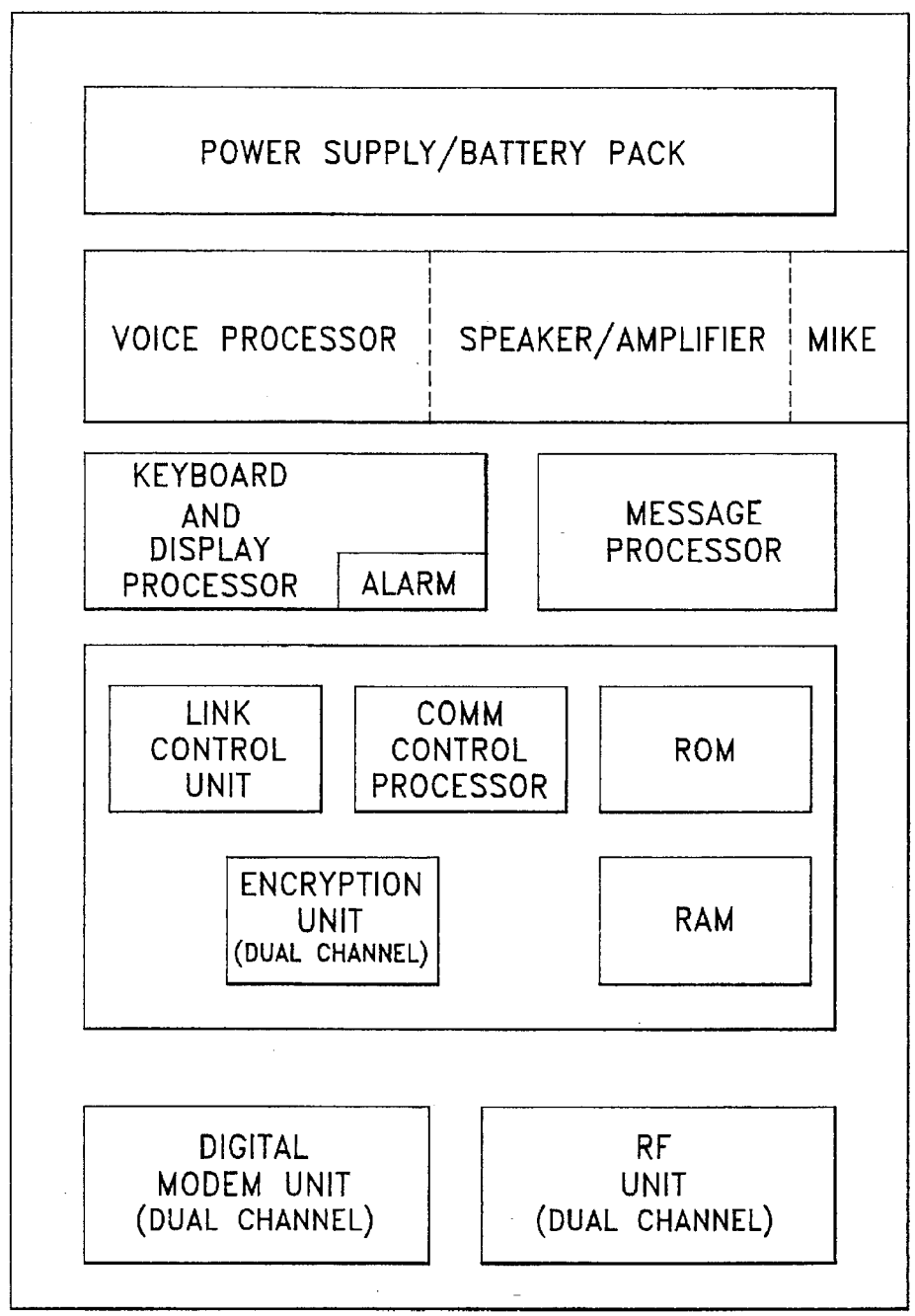
FIG. 5 is a mechanical concept diagram showing an internal view of the invention for one implementation.

For Type 1 (telephone number swap) messages only, the message processor provides the following feature to accelerate the exchange of these messages. Type 1 messages initiated by a Sender device may be responded to by a Target device either automatically, without operator intervention, or manually, with operator intervention required. The operator may select the automatic response mode by prepositioning the AUTO/MANUAL switch located on the front panel of the keyboard and display unit to AUTO. The message processor will read the setting of the AUTO/MANUAL mode switch FIG. 4.0 [3] of the Target device, and set a mode flag enabling the Target communications control processor to determine which mode has been selected and to take the appropriate action.

4.1.2.3.2 Personal Messages

Type 2 and Type 4 (i.e., personal data or voice) messages may only be responded to pending manual intervention by the party Targeted.

4.1.2.3.3 Travel Directions

Type 3 (i.e., travel directions) messages may only be responded to pending manual intervention by the party Targeted.

4.1.2.4 Set-up Circuit

This mode is used by the device operator to configure a full-duplex CDMA circuit for either data or voice traffic. The message processor prompts the operator for information regarding the traffic type selected and the target device address. The message processor alerts the operator when the connection is established with a "Connection Complete" message on the display screen. In addition, for voice connections, ring signals and busy signals are directed to the handset to alert the operator of the call status. The operator uses the device keyboard to send digital messages which are interpreted by the keyboard and display processor as an ASCII stream. The stream is sent to the message processor which forwards it in blocks to the communications control processor. The received incoming ASCII data stream from the message processor is forwarded to the keyboard and display processor which processes it for display on the device screen. Outbound analog voice signals are processed by the voice processor into a digital stream. Inbound digital voice traffic is routed to the voice processing unit for conversion to analog voice and to an audio amplifier/loudspeaker for audibility.

4.1.2.5 Set Broadcast Receiver

This mode is used by the device operator to select the broadcast address, and any associated parameters, for the broadcast receiver. A family of broadcast addresses is reserved, but the operative addresses are CBROAD, EBROAD, GBROAD, and TBROAD, used for chatline broadcast requests, emergency distress broadcasts, general message broadcasts, and traffic broadcasts, respectively. Together with the traffic broadcast address, the metropolitan region code and regional zone code must also be specified. Traffic Broadcasts constitute a special case in that they are sent from a single centralized device operating at higher than normal effective radiated power to cover a large metropolitan region. The major metropolitan regions are each identified by their own city code. Each region is pre-partitioned into several zones, identified by a zone code. An IV-PDCD operating at high effective radiated power, with address TBROAD, sends Type 5 packet broadcast messages containing traffic reports for each zone. Each packet is tagged with the city code and zone code. {All ordinary IV-PDCD's are precluded from using the traffic broadcast address to send broadcast messages, by the device message processor. Any device, however, may be configured to receive such broadcasts.} If the TBROAD receiver address has been selected for a particular device, the message processor will display traffic report messages only for the city/zone specified.

4.1.2.6 Pre-Store Messages

The message processor will enable the operator to pre-store up to 10 personal packet data messages and one packet voice message for use in composing any of the four packet message types.

4.1.2.7 Message Review

The message processor provides a mechanism for identification, storage and retrieval of incoming packet mesages. The number of storable messages is limited only by the memory of the device, but should be on the order of 20 data messages. Only two or three voice messages may be stored due to their extreme message length. Messages can be retrieved by entering the Message Review mode via the Menu. The message processor will then enable the user to scroll through the stored messages in a Rolodex-style fashion, or to select a message by ID number. The message processor will overwrite old messages with new messages on an as required basis. The oldest messages will be overwritten first. The message processor will also maintain a directory in the form of a running log of the addresses (and user names, if available) of all sender devices from which messages have been received. Oldest entries will be overwritten first once memory has been exhausted.

4.1.3 Message Composition and Transfer

In the Send/Receive mode, the message processor controls and guides the composition and transfer of the following four message types between devices: Type 1—Name/Vehicle Description/Telephone Number/Personal Message, Type 2—Vehicle Description/Personal Message and Type 3—Vehicle Description/Travel Directions Information and Type 4—Vehicle Description/Personal Voice Message. (Received Type 5 Traffic Report Broadcasts will be formatted for display only.) The message processor provides a menu for selection of message types by the user. Special prompts to the user via the display unit or templates are provided to assist the user in building each message type. Personal messages may be pre-stored in a buffer, and loaded into the personal message field for any of the message types.

In the Listen/Respond mode, the message processor will format the received message for display and direct the operator to issue a suitable reply for the message type received.

4.1.3.1 Interaction with Keyboard and Display Unit

The message processor receives operator-entered ASCII encoded data from the keyboard and display unit which it uses to format the various message types. It also transfers pre-formatted messages to the keyboard and display unit using ASCII encoding.

4.1.3.2 Interaction with Communications Control Processor

The message processor forwards formatted messages to a prespecified buffer area making them accessible by the communications control processor. It also gathers messages, received and stored by the communications control processor, from a separate prespecified buffer area and prepares them for display on the keyboard and display unit screen.

4.1.3.3 Interaction with the Memory Storage Unit

The message processor stores and maintains all received messages in the memory storage unit. Newer messages may overwrite received messages previously stored if memory availability becomes limited. Overwriting of messages is handled by overwriting the oldest messages first.

4.2 Communications Control Processor

The communications control processor is based on a 68030 microprocessor and performs the following functions. It uses the motor vehicle license plate number of each vehicle which it encodes in binary format to represent that vehicle's network/data link addresses. It uses an algorithm to map any operator-entered Target vehicle license plate number to a session key for use with a standard DES encryption chip to establish secure transmission. Finally, it makes use of a similar algorithm to map the license plate number of a Target vehicle to a frequency channel, frequency band, and code division multiple access code (CDMA) to establish the operational frequency channel for packet operation, or the operational frequency band and CDMA code for circuit operation, respectively. These functions are implemented in software.

The communications control processor performs the equivalent set of functions for a broadcast mode. To send a broadcast message the device operator must enter the pseudo Target license plate number (i.e., CBROAD, EBROAD, or GBROAD) which will be used as the broadcast address. Each device recognizes these broadcast addresses (as well as TBROAD, the traffic report broadcast address) for the receipt of broadcast messages, in addition to their own personal direct visual network addresses. This is made possible by means of an auxilliary encryption unit, an auxilliary digital PSK modem, an auxilliary receiver, and an auxilliary MAC link controller in each device.

The communications control processor interfaces on both sides of the encryption unit (e.g., the encryption unit is functionally sandwiched within the communications control processor). It performs segmentation of outbound messages into block sizes compatible with the encryption unit algorithm; it sends these to the encryption unit. It then reassembles the encrypted outbound segments produced by the encryption unit into message frames and forwards these to the link control unit. For packet transmission, the appropriate MAC address and message type designator are forwarded as well. Similarly, it receives inbound flames from the link control unit which it deframes and segments. It forwards these inbound encrypted data segments to the encryption device. It then reassembles the decrypted message segments forthcoming from the encryption unit into message frames and transfers these to a message queue for receipt by the message processor.

4.2.1 Scheme for Network Addressing/Data Link Addressing

The communications control processor provides a mechanism for addressing motor vehicles (i.e., discriminating between vehicles via a locally unique network communications address) by means of an inter-vehicle address assignment method. The method uses the binary encoding of the six character license plate number of a vehicle to represent both its network and data link addresses. The license plate number is represented in binary either by its ASCII equivalent representation requiring 48 bits or by its BCDIC representation requiring only 36 bits. The communications control processor uses these binary representations of the license plate number to represent the packet network/data link addresses. In particular, an 8-bit ASCII encoding scheme is used for representation of the network address. For representation of the data link address the communications control processor instead uses a 6-bit BCDIC (Binary Coded Decimal Interchange Code) for reasons described in Section 5.2.2.

4.2.2 Scheme for Selection of Session Keys for Link Encryption

4.2.2.1 Selection of Session Keys for Packet Encryption

The communications control processor provides for selection of session keys for establishment of secure communication between vehicles by means of a key selection algorithm. The algorithm selects the session key for packet encryption by using all or a prespecified portion of the Target license plate number to locate a key entry from a pre-stored table of keys. The same table is pre-stored in every IV-PDCD in a read-only memory (ROM) chip. In particular, "N" of the six characters of the vehicle license plate (each having 36 possible states) are used to map to one of $36^N$ unique encryption keys in order to establish the encryption session key. {The actual mapping is determined by first converting the Base 36 number represented by the (portion of the) license plate number to a decimal number, and then performing a table look-up for the entry corresponding to that decimal number.} A selection from a set of as many as $36^6$ keys may be accomodated using this approach. The preferred approach is to select from a table of $36^2$ keys by using the first two character positions of the Target license plate number. (If memory and processing capability permit, then choice of a larger N will reduce the likelihood of two vehicles having the same encryption key.) Table 1 shows a sample mapping of two license plate character positions to $36^2$ unique session keys.

Figure 6:
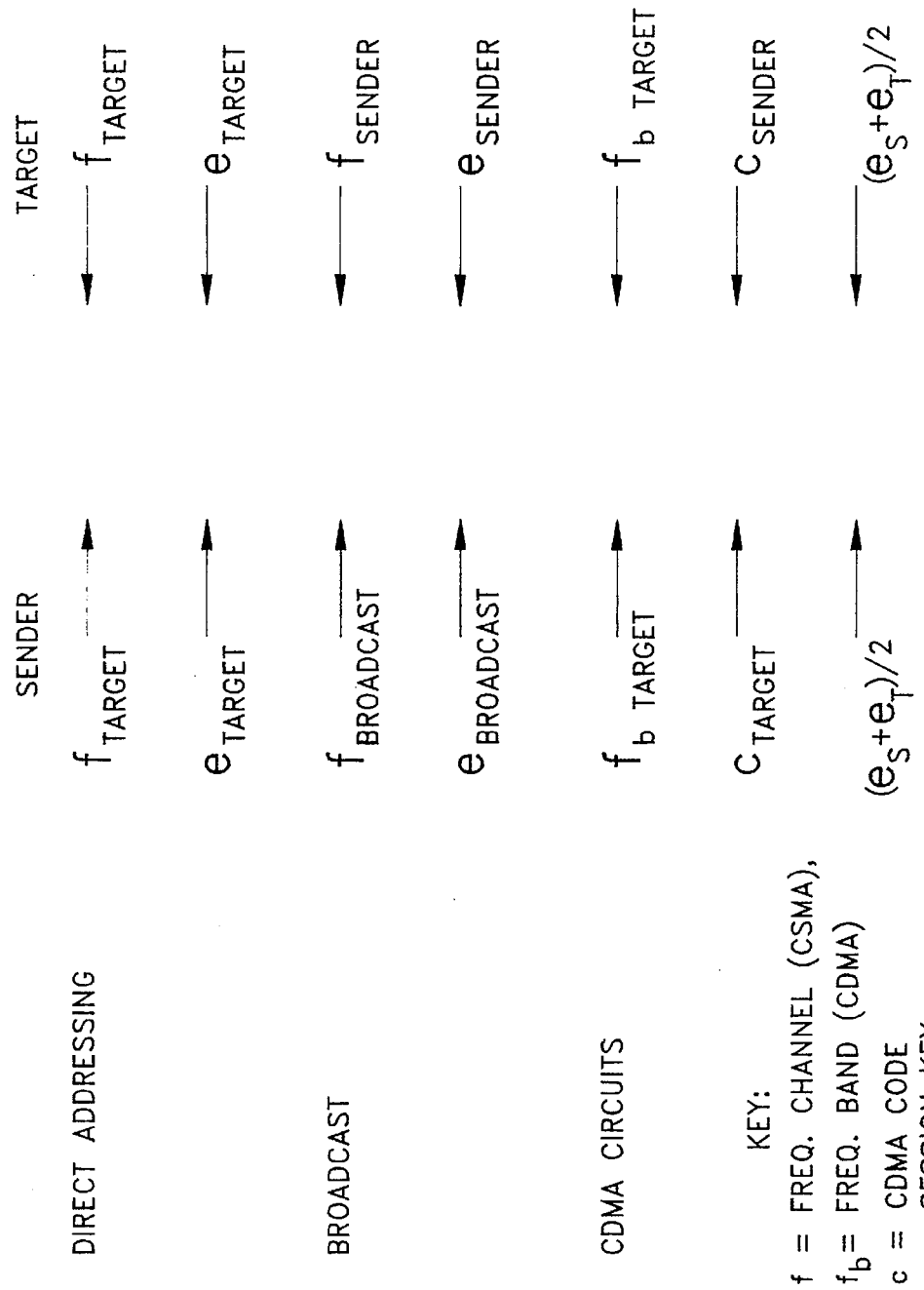
FIG. 6 shows a preferred scheme for the use of frequency channels and encryption (session) keys for the invention acting in both a Sender or a Target role, with both direct visual network addressing and broadcast schemes shown.

The preferred approach for the assignment of session keys to the Sender and Target devices for packet transmissions is shown in FIG. 6, where the same session key (i.e., that determined from the Target vehicle license plate) is used by both. The Sender device is assigned a session key based on the license plate number of the Target vehicle, obtained from the key selection algorithm described in the previous paragraph, to both send and receive messages; the Target device always uses the same session key, based on the Target vehicle license plate number (i.e., its own), to send and receive messages while acting in the Target role.

Key assignments for broadcast messages are handled differently than direct addressed messages. Sender devices will broadcast messages using a broadcast session key obtained using one of the set of pseudo Target license plate numbers with the key selection algorithm. The Sender device will however use its own

TABLE 1

Mapping of License Plate Number to Encryption Keys
Preferred Approach:
Use first two characters to map to
$36^2$ DES keys (56-bits each)

| Characters | DES Key |
|---|---|
| 00 | Key 1 |
| 01 | Key 2 |

TABLE 1-continued

Mapping of License Plate Number to Encryption Keys
Preferred Approach:
Use first two characters to map to
$36^2$ DES keys (56-bits each)

| Characters | DES Key |
|---|---|
| 02 | Key 3 |
| 03 | Key 4 |
| 04 | Key 5 |
| 05 | Key 6 |
| 06 | Key 7 |
| 07 | Key 8 |
| 08 | Key 9 |
| 09 | Key 10 |
| 0A | Key 11 |
| 0B | Key 12 |
| 0C | Key 13 |
| 0D | Key 14 |
| 0E | Key 15 |
| 0F | Key 16 |
| 0G | Key 17 |
| 0H | Key 18 |
| 0I | Key 19 |
| 0J | Key 20 |
| 0K | Key 21 |
| . | . |
| . | . |
| . | . |
| ZZ | Key $36^2$ | session key obtained using its own license plate number to receive replies. Therefore, Target devices are required to use the session key obtained using the pseudo Target license plate number, associated with the setting of the Broadcast receiver link address (i.e., CBROAD, EBROAD, GBROAD, or TBROAD), with the key selection algorithm to receive messages. To respond to broadcast messages, however, Target devices must use the session key obtained using the license plate number of the Sender vehicle. This approach prevents the Sender from having to process extraneous broadcast message requests/responses directed at other devices, which would be the case if the broadcast key were used to both send and receive broadcast messages.

4.2.2.2 Alternative Approaches for Packet Encryption

4.2.2.2.1 Dual Session Keys

Figure 7:
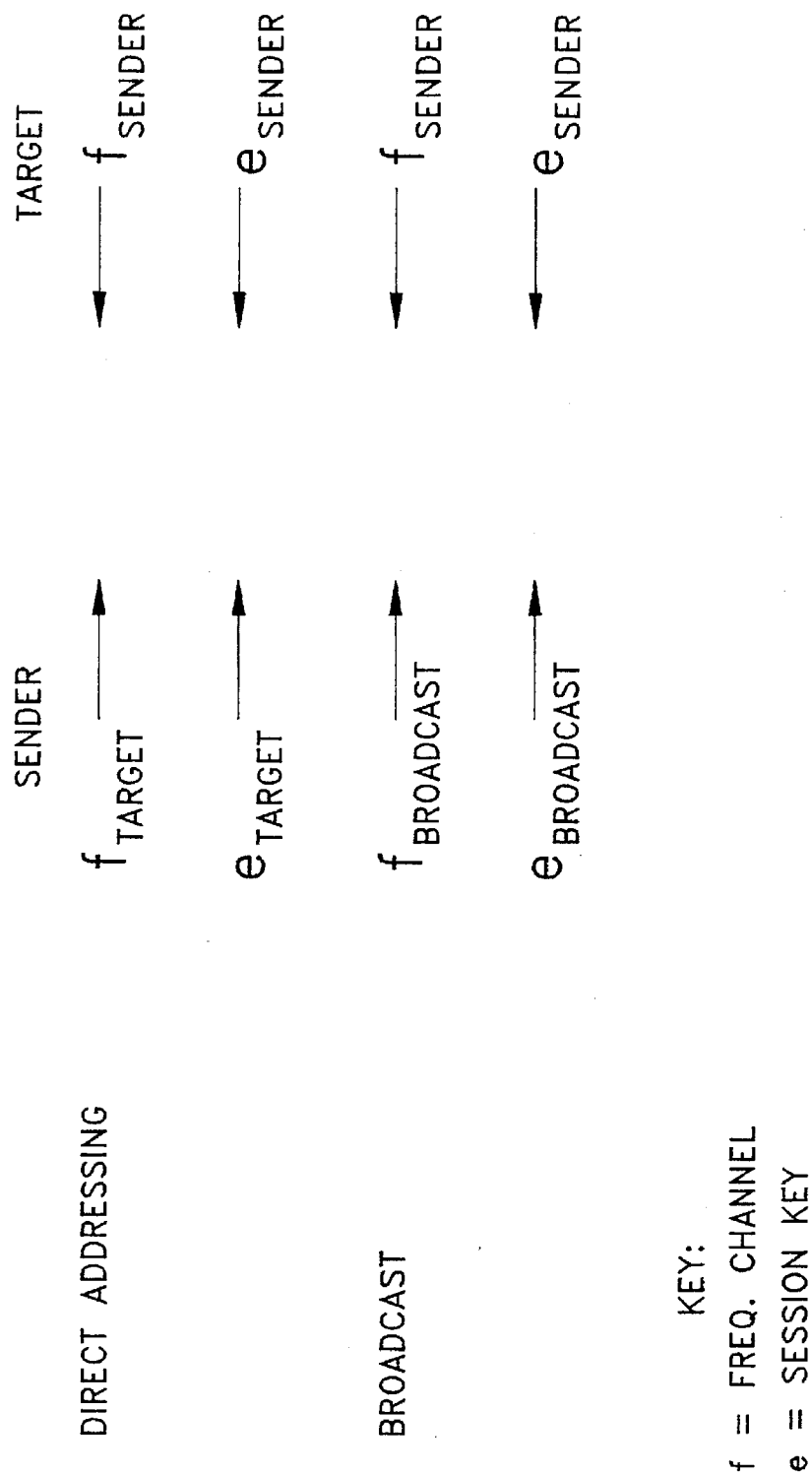
FIG. 7 shows an alternative scheme for the use of frequency channels and encryption (session) keys for the invention acting in both a Sender or a Target role, with both direct visual network addressing and broadcast schemes shown

Several alternative schemes are possible for session key assignments for direct visual network addressed packet messages. One such alternative is shown in FIG. 7. As illustrated, the Sender device could select a session key based on the Target license plate number as in the preferred scheme of FIG. 6. In response, however, the Target device could select a second session key for the reply based on the Sender's license plate number. This would involve two different session keys for each complete message exchange. {This is the preferred approach for sending/receiving broadcast messages only.} This is attractive from the standpoint of security, because it forces an evesdropper to quickly change the receiver key to get both sides of the exchange. The main drawback is that it requires the Target device to quickly respond to the received message and to change the session key for transmission, rather than maintain the same key as in the preferred mode. Another drawback regards the impact on the Sender awaiting a reply. If the Sender device uses its own session key to receive the reply then all messages intended for the Sender from other sources will also be received and need to be sorted out. In the preferred approach, all messages being sent to the Sender are either on the wrong frequency channel (i.e., if multiple channels have been allocated the Sender will receive on the Target frequency channel so that messages sent on the Sender's channel will not be received) or otherwise severely scrambled since the Target session key is in use. The only messages the Sender can receive then are, oddly enough, messages being sent to the Target. The Sender will automatically drop these however since the destination address is incorrect.

4.2.2.2.2 Public Key Encryption

A scheme for public key encryption is possible if each device user is granted a secret key in addition to the public set of keys available to all device users. There are two major drawbacks to this approach. The first is the difficulty of distributing secret keys to each device owner. The second drawback is that it amounts to another two session key alternative with the same drawbacks as described in section 4.2.2.2.1. Further, if a public key encryption approach is also used to authenticate the user, additional time inefficiencies will be realized. One can question the need for user authentication, however, since the license plate number of each vehicle can often be visibly checked. The need for user authentication is, in such cases, precluded.

4.2.2.3 Selection of Session Keys for CDMA Circuit Encryption

The approach to setting up CDMA circuits is described in detail within Section 5.1. In summary, the approach requires the Sender device to send a Type 6 packet message to the Target device to request a CDMA circuit. The Target will respond with a packet message (either Set-Up Affirm or Denial) informing the Sender of whether the resources are available (i.e., there is no other circuit tying up the single channel CDMA resources). If notified that resources are available, the Sender will initiate a CDMA circuit transmission to the Target. Otherwise, the procedure comes to an abrupt halt.

This procedure can be exploited to provide a more robust session code for circuit encryption than that described for packet encryption above. {The same could be provided for packet encryption, but at the expense of two additional packet exchanges.} In particular, the session key for full-duplex circuit encryption can be based upon some mathematical combination of the session keys determined from both the Sender and Target License plate numbers (i.e., using the key selection algorithm for packet transmissions). The preferred approach, as shown in FIG. 6, is to use a session key based on the binary modulo-two addition of both keys so determined, the result of which is divided by two (i.e., shifted right one position). This would provide a random key which would be difficult for an evesdropper to obtain since the individual would need to determine which two vehicles are in communication in order to crack the key. For full-duplex voice communications, two circuits, each implemented with a unique CDMA code, will be implemented. Each circuit will use the exact same session key obtained from the procedure described.

4.2.3 Selection of Frequency Channel/CDMA Code

The communications control processor in the Sender device selects the packet frequency channel of operation by using a group of prespecified character positions from the Target vehicle license plate number to map to an entry in an internal table of frequency channels, as described below. In the preferred approach for direct addressing, the communications control processor in the Target device also uses this same frequency channel assignment to reply to the Sender. This frequency assignment approach is depicted in FIG. 6. An identical method is used for selection of the frequency band of operation for full-duplex CDMA circuits. For broadcast messages, the frequency channel used by the Sender device is determined from the pseudo license plate number associated with the broadcast type. The frequency channel used by a device in responding to such broadcasts is determined from the Sender's license plate number.

Each character position can represent up to thirty-six logical states. An internal table is used to map the states represented by an individual character or character group in the prespecified position(s) (e.g., first, third, sixth) to the allocated number of frequency channels. The algorithm for the mapping is determined by first converting the Base 36 number represented by the character(s) in the prespecified position(s) of the license plate number to a decimal number, and then performing a table look-up for the frequency channel entry corresponding to that decimal number. The internal table contains the complete set of allocated frequency channels. The same table is pre-stored in every IV-PDCD in a read-only memory (ROM) chip. (If thirty-six or fewer frequency channels are allocated then only a single character position is necessary; the allocated frequency channels will be duplicated as uniformly as possible to fill out thirty-six locations in the table as shown in the example of Table 2.)

A similar approach can be used for selecting amongst a group of CDMA codes for configuring a CDMA circuit. As many as $36^6$ different CDMA codes may be selected from using this approach with all six characters of a plate number. For CDMA code selection, the code used by the Sender modulator is determined from the Target license plate number, while that used by the Target modulator is determined from the Sender's license plate number. The reverse is true for the selection of CDMA codes used by the demodulators.

An alternative approach to packet frequency channel assignments is shown in FIG. 7. In this case the Sender uses a frequency channel assignment determined from the Target vehicle license plate number to send a message while the Target device uses a frequency channel assignment determined from the Sender vehicle license plate number to respond. The advantages of this scheme are primarily in the relm of security because an evesdropper would be required to switch frequency channels to gather both sides of a packet message exchange. The primary disadvantage is the need for the Target device to quickly switch frequency channels before responding to a message. This could add a small, but significant delay in releasing the message.

4.2.4 Message Segmentation/Reassembly

The communications control processor interfaces with both sides of the encryption unit. It performs message segmentation to the encryption unit and reassembly of segments received from the unit. For packet transmissions, it also packages encrypted outbound segments into frames, transferring these to the link control (LLC) processor together with the appropriate MAC address and message type Table 2. Mapping of License Plate Number to Frequency Channels Preferred Approach: Use the first character to map to M channels. EXAMPLE: Mapping for eight frequency channels (i.e., M=8)

| Character | Frequency Channel |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 1 |
| 9 | 2 |
| A | 3 |
| B | 4 |
| C | 5 |
| D | 6 |
| E | 7 |
| F | 8 |
| G | 1 |
| H | 2 |
| I | 3 |
| J | 4 |
| K | 5 |
| L | 6 |
| M | 7 |
| N | 8 |
| O | 1 |
| P | 2 |
| Q | 3 |
| R | 4 |
| S | 5 |
| T | 6 |
| U | 7 |
| V | 8 |
| W | 1 |
| X | 2 |
| Y | 3 |
| Z | 4 | designator. For CDMA circuits, only the encrypted segments are forwarded to the link control (SDLC) processor. Similarly, for packet transmissions, it receives inbound frames from the link control (LLC) processor which it deframes, and transfers the encrypted data segments to the encryption device. It then reassembles the decrypted segments into message fields and stores them in the memory storage unit for receipt by the message processor. For CDMA circuits, it receives an encrypted inbound stream from the link control (SDLC) processor, which is segments and transfers to the encryption device. It then reassembles the decrypted segments into a message stream which it forwards to either the voice processor or keyboard and display unit, depending on the circuit set-up parameters.

4.3 Link Control Processor Unit

The LLC link control processor is based on a 68030 microprocessor and an Intel 82592 Advanced CSMA/CD LAN controller and performs the following functions. First, binary encoding of the motor vehicle license plate numbers is used to represent vehicle media access control (i.e, data link) addresses. For transmission, the address is received from the communications control processor with six bits per character encoding based on BCDIC. For reception, the address is forwarded to the communications control processor for decoding/evaluation.

The link control (LLC) processing is dynamic. It follows either a connectionless or connection-oriented approach to flow control and error control depending on the message type. Type 4 messages are accomodated using connection-oriented data link control protocol. All other message types are handled with connection-less data link control protocol. These functions are implemented in software.

The synchronous data link control (SDLC) processor, which supports CDMA circuit transmissions, is based on a 68030 microprocessor. A rudimentary, customized, synchronous link control protocol is implemented which will support real-time digital voice as well as data transmissions. The protocol is a modified version of HDLC. No address fields, control fields or frame check sequences are included in the protocol. This bit-oriented link control protocol simply injects an eight bit flag sequence (i.e., 01111110) into the message information stream, periodically, to permit bit synchronization to be achieved and maintained throughout the transmission. The well know technique of bit stuffing and destuffing is also incorporated within the protocol, on the transmit and receive side, respectively, to preclude portions of the data from being mistaken for the flag sequence. If lock is lost over a short interval, then that portion of the message will also be lost and non-recoverable.

5. COMMUNICATIONS SOFTWARE ARCHITECTURE

This description of the communications software architecture for the inter-vehicle personal data communication network (IV-PDCN) follows the Open Systems Interconection (OSI) model. The IV-PDCN architecture incorporates the following layers of the OSI model: Application (including encryption), Data Link, and Physical. The application layer contains the message processing, communications control processing, and encryption processing functions. These are implemented primarily as software modules. The message processor functions are contained within a message processing application program. The communications control processor functions are contained within a communications control processing application program. This program is used to support communication between two message processing application programs resident in separate IV-PDCD's.

The message processing application program provides the user interface for the IV-PDCD to permit selection of device mode, and to enable a user attempting to send a message to select the message type and enter the relevant message parameters. The communications control processing application program provides for message formatting, implementation of the visual network addressing/access schema, and message segmentation/reassembly for use with encryption. Encryption is provided at the application layer using the data encryption standard (DES) implemented within an Analog Devices ADSP 2111 Digital Signal Processor (DSP) device. Functionally, the encryption algorithm is sandwiched within the communications control processing program.

The data link layer contains both packet and circuit link control processing, which are implemented on two separate link control processors. The packet link control processing consists of a custom logical link control (CLLC) protocol based on IEEE 802.2 and a media access control (MAC) protocol based on IEEE 802.3. The CLLC protocol is implemented in software within the LLC link control processor; the MAC protocol is supported via an Intel 82592 Advanced CSMA/CD LAN controller and by software within the LLC link control processor. The circuit link control processing consists of a rudimentary, synchronous data link control protocol for real-time processing. It is a modified version of HDLC, having neither addressing and control fields, nor frame check sequences. This customized protocol injects flag sequences, for bit synchronization, periodically, within the information stream. It also incorporates bit stuffing and destuffing. It is implemented in software within the circuit link control processor.

The physical layer consists of a digital PSK modem unit and an RF unit. The PSK digital modem unit contains both CDMA spread spectrum and standard PSK modems. The RF unit contains both narrowband and wideband transmitters and receivers. The PSK modem unit and the RF unit are both integrated with and controlled by the communications control processor and link control processor unit.

5.1 Application Layer

The application layer contains the message processing and the communications control processing functions. These are implemented in software modules. The message processor is primarily an application program designed for message building and message reception by the user whereas the communications control processor is primarily an application program designed to facilitate communication between two message processing application programs. The message processor provides the user interface for the IV-PDCD to permit selection of device mode, and to enable a user, attempting to send a data or digital voice message, to select the message type and enter the relevant message parameters. The communications control processor provides for message formatting, implementation of the visual network addressing/access schema, and message segmentation/reassembly for use with encryption.

The message processor allows the device operator to interactively select the mode of operation for the device and to operate the device within that mode. There are seven modes of operation including: DEVICE INITIALIZE, SEND/RECEIVE, LISTEN/RESPOND, SET-UP CIRCUIT, SET BROADCAST RECEIVER, PRE-STORE MESSAGES, and MESSAGE REVIEW.

The communications control processor interfaces with the message processor, the encryption unit, and the link control processor as shown in FIG. 2 and FIG. 3. It operates in either the SEND/RECEIVE or the LISTEN/RESPOND packet modes, or the CIRCUIT mode, as selected by the operator and controlled by the message processor. The communications control processor provides the following features: message formatting and deformatting for each permissable mode and message type, message queuing, and message segmentation and reassembly for properly interfacing with the encryption device. For implementation of the visual network addressing/access schema, it also contains algorithms/tables for selection of transmission parameters including: network/data link addresses, encryption session keys, CDMA codes, and packet frequency channels or CDMA frequency bands of operation; it forwards these parameter selections to the link control processors, the encryption unit, digital modems, and the RF unit, respectively, in order to establish communications. The software implementation of these processor functions is described in detail in the following paragraphs.

5.1.1 Message Processor Software

FIG. 8 is Part I of a flow diagram which serves to describe the software process flow for the message processor. When the IV-PDCD is powered on by means of a front panel switch [1] shown in FIG. 4, the message processor will commence a device RESET procedure FIG. 8. The procedure can also be invoked by pressing the RESET key FIG. 4 on the device front panel. If at any time the user wishes to change the mode of operation for the device, this can be achieved by pressing the RESET MODE key, or by keying in the command "RESET MODE". If, when the RESET command is entered, the current mode is active, the message processor will wait until all mode processing is complete before permitting a mode change as part of the RESET procedure.

Figure 9:
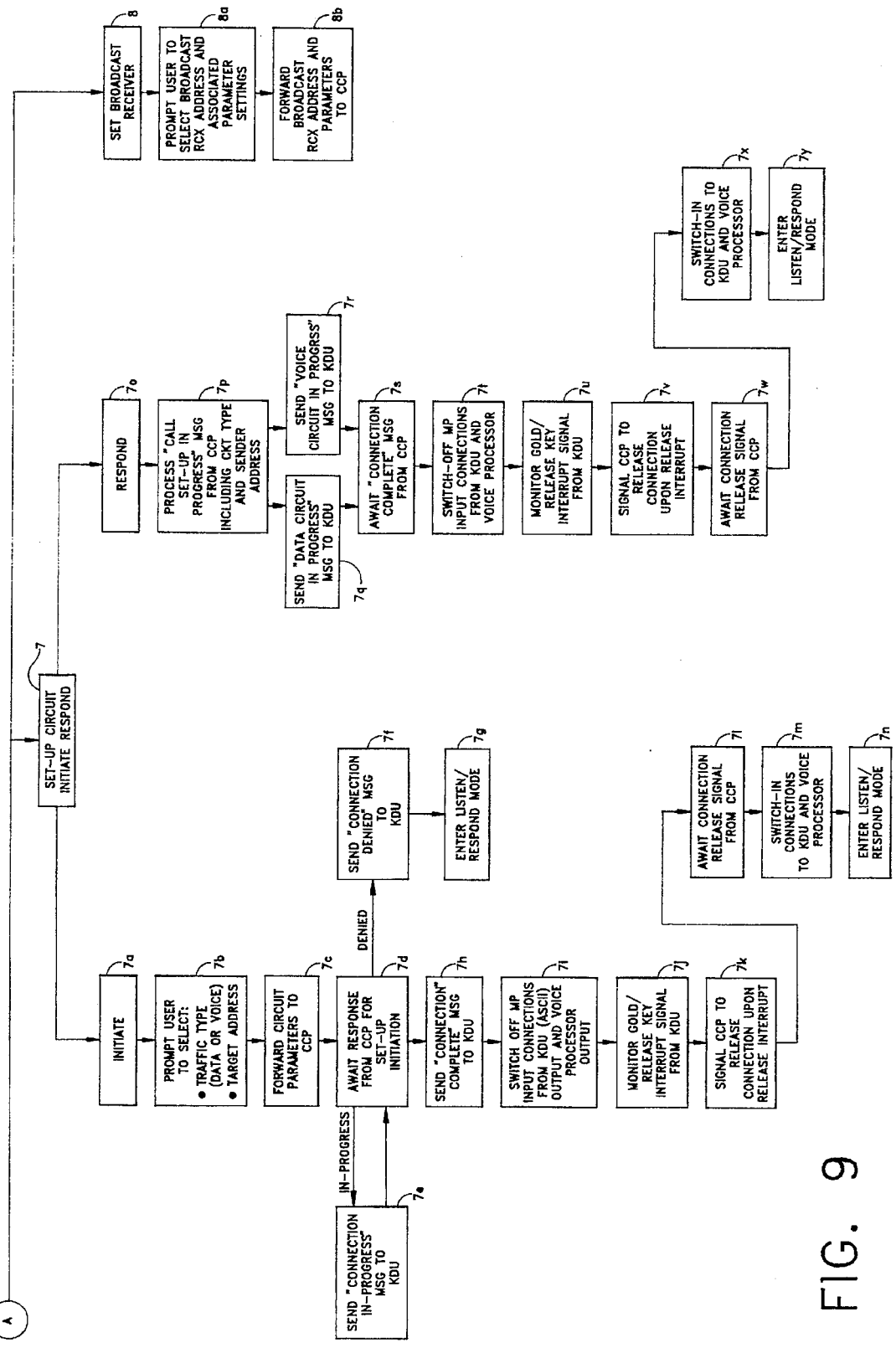
FIG. 9 is Part II of the process flow diagram for the Message Processor of the invention.

Immediately following the RESET procedure, the message processor will read the position of the AUTO/MANUAL switch to determine whether Type 1 message requests should receive an autonomous response FIG. 8 [0a]. If the switch is set to the AUTO position, the message processor will set the AUTO flag to be read by the communications control processor [0b]. The message processor will then check to see that the device has been initialized [0c]. If not, it will force the operator to initialize the device by entering the DEVICE INITIALIZE mode [2]. Otherwise, it will prompt the user to make a mode selection by displaying a "SELECT MODE" command [1] on the keyboard and display unit FIG. 2. The device user must respond by keying in one of the seven modes of operation shown in FIG. 8 and FIG. 9 including: DEVICE INITIALIZE [2], SEND/RECEIVE [3], LISTEN/RESPOND [4], PRE-STORE MESSAGES [5], MESSAGE REVIEW [6], SET-UP CIRCUIT [7], and SET BROADCAST RECEIVER [8],. If mode selection by the operator is not forthcoming within thirty seconds the device defaults to the LISTEN/RESPOND mode.

The software process flow for the message processor is described in detail for each device mode of operation in the following paragraphs. Although not explicitly stated in these paragraphs, or on the flow diagrams themselves, it should be clarified that the message processor analyzes every input command. It disallows all invalid command entries informing the operator by means or an "Invalid Command", or equivalent message. This message is displayed on the Keyboard and Display Screen adjacent to the location of the invalid entry.

5.1.1.1 DEVICE INITIALIZE

Before the device can be operated it must first be initialized by the user as described in FIG. 8. The device should be re-initialized each time the owner transfers it to a different vehicle. {NOTE: The number of re-initialization attempts are counted on a monthly basis. The monthly total is restricted to a small finite number to prevent a user from masquerading, regularly, as a device belonging to other vehicles in order to evesdrop.}

To initialize the device, the user keys in the words "DEVICE INITIALIZE" [2], via the keyboard and display unit, in response to the message processor "SELECT MODE" [1] command issued at power up. The message processor responds by prompting the user to key in the following personal information [2a].

ENTER

User Name:
User's Telephone Number:
Vehicle License Plate Number:
Vehicle Model:
Vehicle Color:
Vehicle Model Year:
Set Time/Date:

Upon receipt of this information, the message processor stores the results in memory and sets the INITIALIZE COMPLETE flag [2b].

5.1.1.2 SEND/(RECEIVE)

This section emphasizes the SEND [3a] capabilities of the message processor for the SEND/RECEIVE mode. This mode enables the device user to SEND a packet message to the Target device, and to process a response (i.e., RECEIVE) from the Target device alone. To send a packet message, the user keys in the words "SEND/RECEIVE" [3], via the keyboard and display unit, in response to the message processor "SELECT MODE" [1] command issued at power up or following RESET MODE command [0]. The message processor responds by prompting the user to key in the following personal information [3b].

SELECT ONE OF THE FOLLOWING MESSAGE TYPES:
Type 1—Telephone Number Exchange
Type 2—Message Greeting Only
Type 3—Travel Directions Request
Type 4—Digital Voice Message A Type 1 message enables the operator to swap telephone numbers with the Target party. Due to the sensitive nature of such information it will reveal not only the telephone number but also the name of the Sender. The other message types will maintain the anonymity of the Sender, except for a description of his/her vehicle and license plate number. However, the Sender may choose to include his/her name in the message body itself.

If a Type 1 or Type 2 message is selected, the user will be prompted to enter the following data into the device memory via the keyboard and display unit:

Target Vehicle License Plate Number*
Identify Pre-Stored Personal Message (Optional)
Manually Enter New Personal Message (Optional)
(Only one of the optional messages must be selected.)

* For all message types the device will display the Target vehicle license plate number of the most recent vehicle accessed since power-up, if any. The operator can choose to overwrite this address. This feature enables the operator to easily and quickly send additional messages to the same Target vehicle, if desired.

{NOTE: In order to send a broadcast message, rather than a person-to-person message, the operator should use the appropriate pseudo license plate number, for the particular type of broadcast, in place of the Target license plate number. All devices will be designed to recognize these broadcast addresses in addition to their own personal direct address.}

The operator is not required to manually enter Name (included in Type 1 messages only) and Vehicle Description because the pre-stored initialization data is used to supplement manually entered data for all message types.

If a Type 3 message is selected, the user will be prompted to enter the following data into the device memory via the keyboard and display unit:

Target Vehicle License Plate Number*
Desired Street address (Optional)
Desired Route/Highway/Interstate ID (Optional)
Name of Desired Place (Optional)
Other Information Requested (Optional)
(Only one of the optional messages must be selected.)

If a Type 4 message is selected, the user will be prompted to enter the following data into the device memory via the keyboard and display unit:

Target Vehicle License Plate Number*
Identify Pre-Stored Voice Message (Optional)
Record Voice Message (Optional)
(Only one of the optional messages must be selected.)

If the Record option is selected, the user will receive the following prompt:

Begin Recording when Red Light Comes On (FIG. 4.0 [4]) (Please limit message duration to 10 seconds)

The device will use the digital voice processing as described in Section 5.1.1.2.1. Upon completion of the data entry for all of the above message types, the user must press the MESSAGE RELEASE key FIG. 4 to signal the communications control processor to process the message for transmission FIG. 8 [3c]. The message processor will inform the communications control processor of both the message type and its location in the memory storage unit.

When operating in the SEND/RECEIVE mode, the message processor will only accept and process responses received from the Target device engaged, except in the case of broadcast messages. For broadcast messages, the message processor will accept all responses to a broadcast message it has initiated, since responses are transmitted using the Sender device's session key and frequency channel. RECEIVE processing is described in the following Section 5.1.1.3.

5.1.1.2.1 VOICE PROCESSING

The device incorporates a digital voice processor, based on an AT&T DSP1616 digital signal processing (DSP) chip as shown in FIG. 3. When activated by the message processor, the voice processor accepts speech input from a microphone. The voice processor samples and performs an A-law analog-to-digital (A/D) conversion to PCM format on each sample. The resultant 64 Kbps digital output stream is fed to a Vector Sum Excited Linear Prediction (VSELP) speech-compression algorithm and error correction function in accordance with EIA/TIA/IS-54. For voice circuits, the digital stream is forwarded directly to the communications control processor. By contrast, for packet messages, the result is stored in memory for building the Type 4 message. The effective output data rate from the voice processor is 8000 bps, therefore, a 10 second packet message will use about 10,000 octets of memory. Transmission of a digital packet voice message will require about 25 packets of 400 octet length, not including overhead. Incoming digital voice messages follow the reverse order processing sequence and are output as an analog voice signal from the A-law D/A converter to an audio amplifier and loudspeaker.

5.1.1.3 (SEND)/RECEIVE

This section emphasizes the RECEIVE [3d] capabilities of the message processor for the SEND/RECEIVE mode FIG. 8. For a Sender device, after a packet message has been received from a Target device and processed by the communications control processor, the message will then be forwarded to the message processor. The message processor will perform the following operations:

1. Evaluate message type field and reformat the message in a manner consistent with the message type [3e].
2. Forward data messages to the Display Unit for display on screen. Forward the digital voice segment of voice messages to the Voice Processor for receive processing and sound reproduction. Display Target User identity on screen for both message types[3f].
3. Signal operator as to receipt of a data message only, by means of alarm contained within Keyboard and Display Unit [3g].

The following are exemplary message contents for each message type:

| | |
|---|---|
| Type 1: | Target Operator Name |
| | Target Vehicle Description |
| | Target License Plate Number |
| | Target Telephone Number |
| | Target Message (Optional) |
| Type 2: | Target Vehicle Description |
| | Target License Plate Number |
| | Target Message |
| Type 3: | Target Vehicle Description |
| | Target License Plate Number |
| | Travel Information Response |
| Type 4: | Target Vehicle Description |
| | Target License Plate Number |
| | Voice Message |

5.1.1.4 LISTEN/(RESPOND)

This section emphasizes the LISTEN FIG. 8 [4a] capabilities of the message processor for the LISTEN/RESPOND mode. This mode is used to enable the device user to assume the role of Target device, and thereby LISTEN for messages forthcoming from other devices acting in a Sender role, and to respond to these messages. To enter the LISTEN/RESPOND mode, the user keys in the words "LISTEN/RESPOND" [4] via the keyboard and display unit in response to the message processor "SELECT MODE" [1] prompt issued at power-up or following a "RESET MODE" [0] command. Alternatively, the device defaults to the LISTEN/RESPOND mode if mode selection by an operator is not forthcoming within thirty seconds of the "SELECT MODE" prompt. The message processor responds first by displaying the TIME and DATE [4b] on the display screen until a message arrives to interrupt this feature.

In the Target role, the message processor will listen for an interrupt control signal from the communications control processor, indicating that a message has been received. Upon the receipt of signal, the message processor will perform the following operations:

1. Evaluate message type field and reformat the message in a manner consistent with the message type [4c].
2. Forward data messages to the Display Unit for display on screen. Forward the digital voice segment of voice messages to the Voice Processor for receive processing and sound reproduction. Display Sender user identity on screen for both message types [4d].
3. Signal operator as to receipt of a data message only, by means of alarm contained within Keyboard and Display Unit [4e].

The following are exemplary message contents for each message type:

| | |
|---|---|
| Type 1: | Sender Operator Name |
| | Sender Vehicle Description |
| | Sender License Plate Number |
| | Sender Telephone Number |
| | Sender Message (Optional) |
| Type 2: | Sender Vehicle Description |
| | Sender License Plate Number |
| | Sender Message |
| Type 3: | Sender Vehicle Description |
| | Sender License Plate Number |
| | Sender Travel Information Request |
| Type 4: | Sender Vehicle Description |
| | Sender License Plate Number |
| | Voice Message |

5.1.1.5 (LISTEN)/RESPOND

This section emphasizes the RESPOND [4f] capabilities of the message processor for the LISTEN/RESPOND mode [4]. The Target device operator will have the option of issuing a response to a received message. The operator will not be required to supply any return addressing information for this response. This information is already known by the Target message processor, having been received with the Sender's message. The message processor will read the message type [4g] and prompt the operator to respond to all message types, with the exception of Type 1 messages [4h]. If the Target operator chooses not to respond, the message processor will time-out after one minute if the keyboard is not activated. (The user will have to use the SEND/RECEIVE mode to contact the message originator after a message time-out.) If the Target operator composes a response to the message received, the release key FIG. 4 must normally be pressed to signal the message processor to forward the message response to the communications control processor FIG. 8 [4i].

Responses to Type 1 messages are treated differently than the other message types. Most importantly, the reply feature can be automated for Type 1 messages by setting the AUTO/MANUAL switch FIG. 4 on the front panel of the Keyboard and Display Unit to AUTO, if the operator so desires. (This action will normally be taken before the device is powered on or prior to pressing the MODE RESET [0] switch.) The message processor reads the AUTO switch position [0a] and sets a flag [0b] only if the AUTO mode has been selected. This flag is used by the communications control processor as an indication to immediately respond to a Type 1 message.

Otherwise, to send a manual reply for a Type 1 message, the operator need only strike the release key [4i]. The message processor will respond with a Type 1 message. If the release key is not pressed within one minute, a timeout will occur and a reply will not be sent.

To send a reply to a Type 2 message, the message processor prompts the operator for a response to the message received [4h]. The operator must first key in a response. The release key must be pressed to send the message response [4i].

To send a reply to a Type 3 message, the message processor prompts the operator for a response to the request for travel directions [4h]. The operator must first key in a response. The release key must be pressed to send the message response [4i].

To send a reply to a Type 4 message, the message processor prompts the operator for a response to the voice message [4h]. The response may take the form of either a voice or a data message. The release key must be pressed to send the message response [4i].

5.1.1.6 SET-UP CIRCUIT INITIATE/(RESPOND)

This section emphasizes the INITIATE [7a] capabilities of the message processor for the SET-UP CIRCUIT mode. This mode enables the device user to configure a full-duplex circuit with a Target device for either voice or data transmission. While operating in this mode, the packet mode is used exclusively for signalling by means of Type 6 messages. To enter this mode, the user keys in the words "SET-UP CIRCUIT" [7], via the Keyboard and Display unit (KDU), in response to the message processor "SELECT MODE" [1] command issued at power up or following RESET MODE command [0]. This places the device in the Circuit Initiate state [7a]. The message processor responds by prompting the user to key in the following personal information [7b].

SELECT CIRCUIT TYPE (Voice or Data):
ENTER TARGET LICENSE PLATE NUMBER:

Upon receipt of this information, the message processor (MP) issues a Circuit Set-up Request message to the communications control processsor (CCP) together with this information [7c]. It then awaits a response from the CCP [7d].

If the request is denied because the CDMA resources are busy, the MP will forward a "Connection Denied" message to the KDU for display to the user [7f]. The MP will then enter the LISTEN/(RESPOND) mode [7g].

If a connection in-progress indication is forthcoming from the CCP, the MP will forward a "Connection In-Progress" message to the KDU for display to the user [7e]. It will then continue to await confirmation of the completed connection from the CCP [7d].

The message processor will receive a circuit set-up complete indication from the CCP once the full-duplex circuit is in place. In response, the message processor will forward a "Connection Complete" message to the KDU for display to the user [7h].

The MP will switch off input connections from both the KDU (ASCII) output and the voice processor output [7i]. Following this time any voice or data input will be received and processed directly by the CCP. {The communications control processor will only accept input from either from the Keyboard and Display unit or the Voice Processor depending on which circuit type has been configured.}

The MP will then, primarily, monitor the interrupt line from the KDU for a release interrupt signal [7j]. This signal will result from the Gold key [5]/Release key [2] combination, shown in FIG. 4, being pressed by the user to release the connection.

Upon receipt of an interrupt signal, the message processor will signal the CCP to release the connection [7k]. The MP will await confirmation from the CCP for the success of this action [7l].

Upon confirmation of the connection release from the CCP, the message processor will re-establish the connections to the KDU and Voice Processor which had been disconnected [7m].

The message processor will then automatically revert to the LISTEN/(RESPOND) mode [7n].

5.1.1.7 SET-UP CIRCUIT (INITIATE)/RESPOND

This section emphasizes the RESPOND [7o] capabilities of the message processor for the SET-UP CIRCUIT mode [7]. This mode enables a Target device to configure a full-duplex circuit, in response to a circuit initiate request from a Sender device, for either voice or data transmission. {While operating in this mode, the only packet transmissions used are those for signalling, using Type 6 messages.} This mode is initiated after a message processor receives a "Call Set-Up in Progress" message from the CCP with an indication of the circuit type (data or voice) and the Sender address [7p]. For a data circuit request, the MP forwards a "Data Circuit In Progress" message to the KDU for notification to the device user [7q]. For a voice circuit request, the MP forwards a "Voice Circuit In Progress" message to the KDU for notification to the device user [7r]. The MP then awaits a "Connection Complete" message from the CCP [7s].

Upon receipt of the connection complete message, the MP switches off the input connections from both the KDU (ASCII) and the voice processor [7t]. Following this time any voice or data input will be received and processed directly by the CCP. {The communications control processor will only accept input from either from the Keyboard and Display unit or the Voice Processor depending on which circuit type has been configured.}

The MP will then, primarily, monitor the interrupt line from the KDU for a release interrupt signal [7u]. This signal will result from the Gold key [5]/Release key [2] combination, shown in FIG. 4, being pressed by the user to release the connection.

Upon receipt of an interrupt signal, the message processor will signal the CCP to release the connection [7v]. The MP will await confirmation from the CCP for the success of this action [7w].

Upon confirmation of the connection release from the CCP, the message processor will re-establish the connections to the KDU and Voice Processor which had been disconnected [7x].

The message processor will then automatically revert to the LISTEN/(RESPOND) mode [7y].

5.1.1.8 SET BROADCAST RECEIVER

This mode is used to enable the operator to set the receive address of the broadcast receiver for receipt of packet broadcast messages. The operator enters this mode by keying in the command "SET BROADCAST RECEIVER" [8] in response to the "SELECT MODE" [1] request issued by the message processor upon power-up or MODE RESET [0]. The following prompts are then issued by the message processor in response to the SET BROADCAST RECEIVER command [8a]:

SELECT BROADCAST RECEIVER ADDRESS:

Available Options:

CBROAD (Chat line):

EBROAD (Emergency Distress):

GBROAD (General Broadcast):

TBROAD (Traffic Reports):

If the Traffic Reports address is selected, the message processor requests the following additional information:

ENTER METROPOLITAN REGION CODE:

ENTER REGIONAL ZONE CODE:

Upon receipt of this information the message processor issues a Set Broadcast Receiver message to the communications control processsor [8b]. This message signals the processor to retrieve the broadcast receiver address parameters from the memory storage unit.

The default broadcast receiver address is, GBROAD, which is the general broadcast address. The communications control processor automatically uses this address to configure the broadcast receiver upon device start-up. The operator must use the Set Broadcast Receiver mode to override this default.

5.1.1.9 PRE-STORE MESSAGES

This mode is used to enable the operator to pre-store data or voice packet messages. The operator enters this mode by keying in the command "PRE-STORE MESSAGES" [5] in response to the "SELECT MODE" [1] request issued by the message processor upon power-up or MODE RESET [0]. The following prompts are issued by the message processor in response to the PRE-STORE MESSAGES command:

MESSAGE TYPE (DATA or VOICE)? [5a,5d]

For a VOICE selection, the message processor responds with the following prompt [5b]:

Begin recording VOICE MESSAGE #XYZ when the RED light goes on:

(The device will use the digital voice processing approach described in Section 5.1.1.2.1. The digitized voice message will be stored [5c] in the memory storage unit.)

For a DATA selection, the message processor responds with the following prompt [5e]:

Enter DATA MESSAGE #XYY (The message processor will store the data message in the memory storage unit [5f].)

5.1.1.10 MESSAGE REVIEW

To review packet messages received or prestored packet messages the operator enters this mode by keying in the command "MESSAGE REVIEW" [6] in response to the SELECT MODE [1] request issued by the message processor upon power-up or MODE RESET [0]. The following prompts are issued by the message processor in response to the MESSAGE REVIEW command:

MESSAGE REVIEW TYPE:

PRE-STORED MESSAGES [6a]

RECEIVED MESSAGES [6b]

(Note: Pre-stored packet messages are those that have been composed in advance by the user of the Sender device, whereas received packet messages are those that have been received from various Target devices.)

Following selection of either of the two types, the message processor responds with the following menu [6c]:

You have "D" PRE-STORED(/RECEIVED) messages

Scroll Mode (S)?

ID Mode (I)?

For selection of the Scroll Mode, the message processor requests the following [6d]:

Enter message number you wish to scroll from?

Scroll Forward/Backward (F/B)?

(The message processor displays the selected message [6f].)

For selection of the ID Mode, the message processor requests the following [6e]:

Enter the message ID number you wish to review (The message processor displays the selected message [6f].)

The operator may DELETE a message at any time by typing in DELETE after the message is made available by the message processor [6g]. The message processor will respond with the following prompt:

Are you sure you want to delete DATA/VOICE MESSAGE #XYZ?

The Operator must respond with YES or NO [6g] before the DELETE action is carried out. A response of "NO" will prevent the message from being deleted.

5.1.2 Communications Control Processor Software

Figure 10:
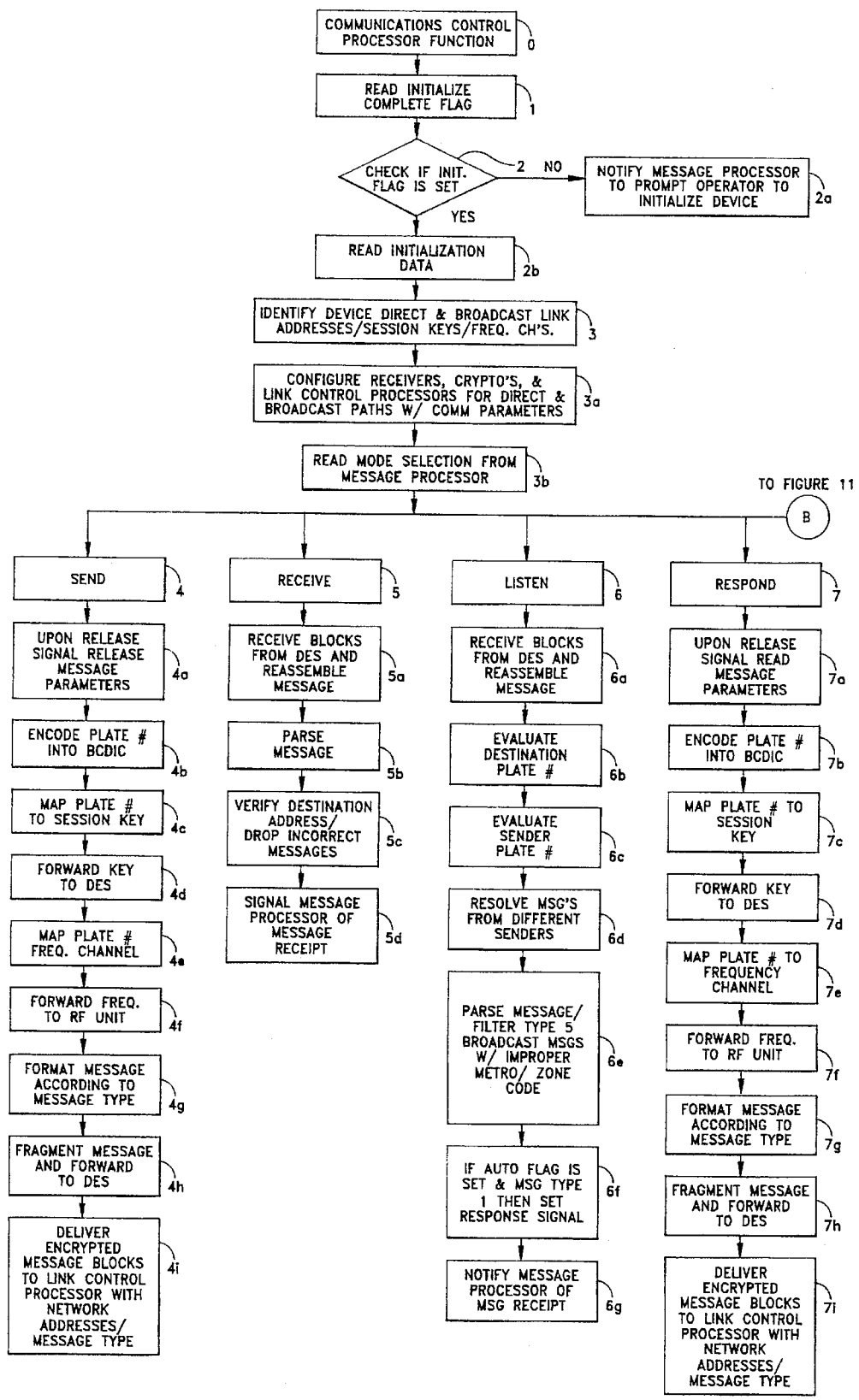
FIG. 10 is Part I of the process flow diagram for the Communications Control Processor of the invention.
Figure 11:
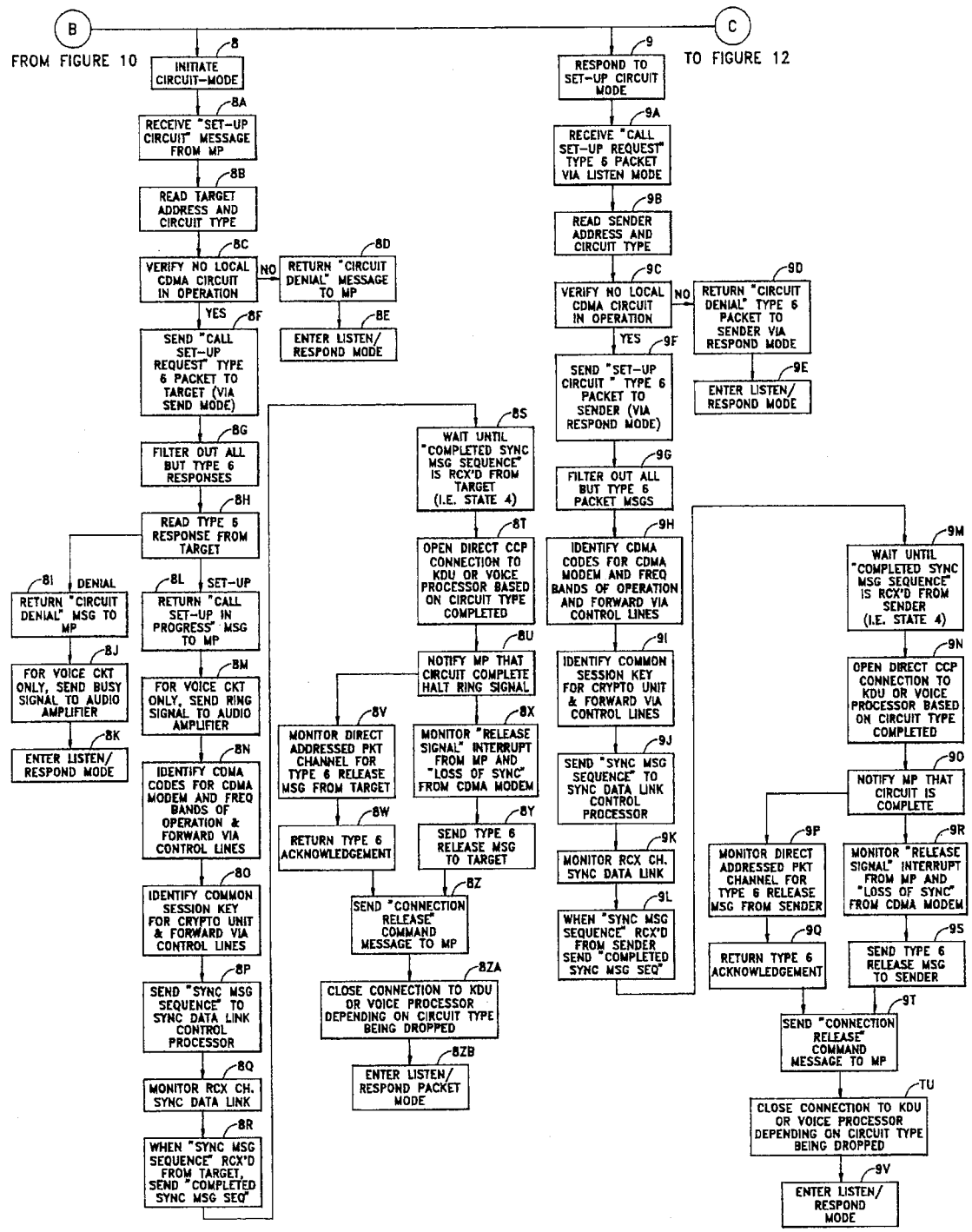
FIG. 11 is Part II of the process flow diagram for the Communications Control Processor of the invention.
Figure 12:
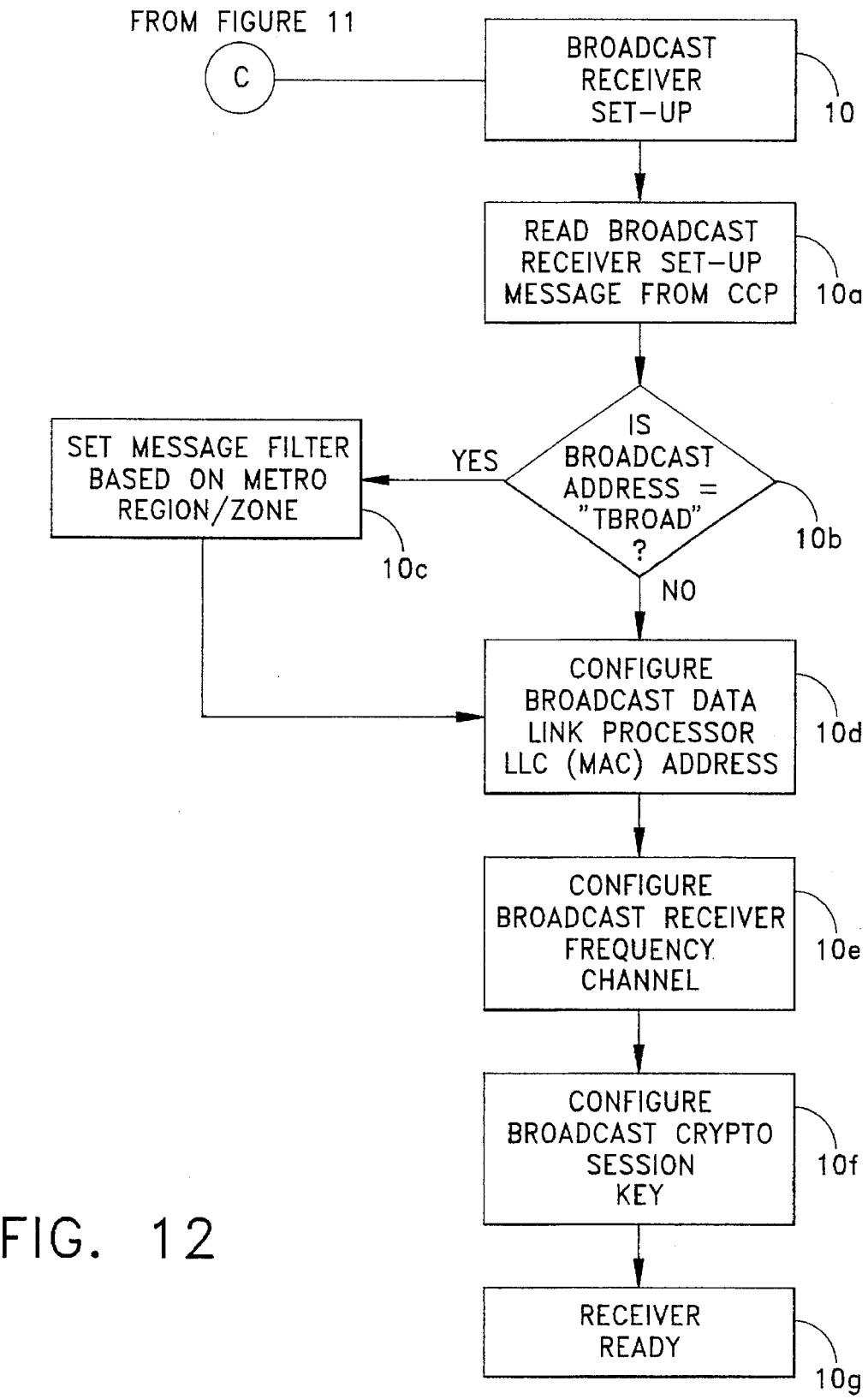
FIG. 12 is Part III of the process flow diagram for the Communications Control Processor of the invention.

The communications control processor function [0] described in FIG. 10 can operate in either a SEND/RECEIVE or a LISTEN/RESPOND mode by operator selection, to establish a Sender device or a Target device for packet operation, respectively. It can also operate in a circuit mode by operator selection of the SET-UP CIRCUIT mode. The software functions required for each of these modes of operation are herein described for the communications control processor.

The communications control processor interfaces with the message processor, the memory storage unit, the encryption unit, the link control unit, and the RF Unit. It provides: 1) message formatting and deformatting for each permitted mode and message type, 2) message queuing, and 3) message segmentation and reassembly for properly interfacing to the encryption device. It also contains algorithms/tables for selection of network/data link addresses, encryption keys, CDMA codes, and packet frequency channels, or CDMA frequency bands of operation which it forwards to the link control processor unit, encryption unit, digital modem unit, and RF unit, respectively, to establish communication.

5.1.2.1 Device Power-Up

Upon device power-up the communications control processor first reads the initialize complete flag [1]. It then checks the status of the initailize complete flag [2]. If the flag is set, it reads the initialization data from a prespecified memory area [2b], otherwise it sends a signal to the message processor to prompt the operator to initialize the device [2a]. The step is repeated until device initialization has been completed. The device then prepares to enter the LISTEN/RESPOND mode, a packet transmission mode, which is the default mode of operation. The communications control processor uses a group of characters from the vehicle's own license plate number to identify the device's own direct data link address, encryption session key, and frequency channel, for packet operation in accordance with the CCP algorithms [3] as described in Section 4.2. These are to be used whenever the device is acting in a Target role (i.e., LISTEN/RESPOND mode). The default broadcast data link address, encryption session key, and receive frequency channel are also identified based on the default target pseudo license plate number "GBROAD". The device then configures the link control unit, encryption unit, and RF unit, for both the direct and broadcast paths, based on these parameters [3a].

When the device is acting in a Target role (i.e., LISTEN/RESPOND mode), the encryption unit will always use the Target's own session key to both listen and respond to messages. When the device is acting in the Sender role, the unit will always use the session key of the Target device to both send and receive messages. The only exception is for broadcast messages. For these, the Sender device uses the session key corresponding to the selected broadcast address to send messages, while the Target device uses the exact same session key to receive messages. The Target device then uses the session key of the Sender for issuing a reply. An auxilliary encryption processor is therefore provided to enable the device to listen for both directly addressed and broadcast messages simultaneously.

The communications control processor uses one or more characters from the vehicle license plate number to identify its own relative frequency channel of operation, for packet communications, from the frequency channel allocation table in accordance with the algorithm described in Section 4.2.3 [3]. This frequency channel is to be used by the RF unit whenever the device is acting in a Target role. The broadcast frequency of operation is also identified using the same algorithm based on the default pseudo license plate number, "GBROAD".

When the device is acting in a Target role the RF unit will always use the Target device's packet frequency channel of operation to both listen and respond to messages. When the device is acting in the Sender's role, the unit will always use the operational frequency channel of the Target device to both send and receive messages. The only exception is for broadcast messages. For these, the Target device uses the frequency channel designated by the default broadcast address "GBROAD" to receive messages, and uses the Sender's frequency channel of operation when issuing a reply. An auxilliary receiver and modem are provided to enable the device to receive both directly addressed and broadcast messages concurrently.

The communications control processor reads the user mode selection from message processor [3b] and begins the appropriate procedure for the mode selected. The Listen Respond mode is the default mode if no selection is forthcoming within thirty seconds.

5.1.2.2 Send/(Receive)

This section emphasizes the Send [4] capabilities of the communications control processor for the Send/Receive mode. Upon detection of the message release signal, the communications control processor will perform the following functions:

1. Retrieve ASCII encoded message fields from device memory [4a] for the message type being sent.
2. Convert the six character license plate number to binary coded decimal interchange code (BCDIC) (36 bits) from ASCII (48 bits), while preserving the ASCII format [4b]. If fewer than six characters are used in the license plate number as is the case for certain vanity plates, then stuff the unused character fields with zeros. If more than six characters are used, then limit the representation to only the first six characters. Table 3 shows two examples of binary encoded license plate numbers.
3. Map a group of characters from the Target license plate number to a single encryption key contained within a pre-stored table of keys [4c] using the key selection algorithm described in Section 4.2.2.1. Table 1 shows an example of a mapping between the first two characters of a license plate and a group of 362 keys. This is the preferred approach though many other possibilities exist.
4. Forward selected key to the encryption device [4d].
5. Map a character of the Target license plate number to a single frequency channel contained within a pre-stored table of the allocated frequency channels [4e] using the frequency channel selection algorithm described in Section 4.2.3. Table 2 shows an example of a mapping between the first character of a license plate number and a group of only eight frequency channels. It is impossible to predict the number of channels that could be made available for this system by the FCC, however it is suspected that the number will be small. The preferred approach therefore uses only the first character of the license plate number. Any of the other character positions would equally suffice except for the latter ones which are sometimes absent in special vanity plates.
6. Forward selected frequency channel to the RF unit [4f].
7. Build a message formatted in accordance with the message Type

TABLE 3

| Address Encoding Examples |
|---|
| Example 1: License Plate Number: 193-MVR |
| BCDIC Representation |
| of Network Address: |
| 000001/001001/000011/100100/010101/101001 |
| ASCII (odd parity) Representation |
| of Network Address: |
| 00110001/10111001/10110011/11001101/11010110/01010010 |

TABLE 3-continued

| Address Encoding Examples |
|---|
| Example 2: License Plate Number: 4HUGS |
| BCDIC Representation |
| of Network Address: |
| 000100/111000/010100/110111/010010/000000 |
| ASCII (odd parity) Representation |
| of Network Address: |
| 00110100/11001000/11010101/11000111/11010011/00000000 |

TABLE 4

| Message Type Field Encoding | |
|---|---|
| Message Type | Encoding |
| Type 1 | 00000000 |
| Type 2 | 00000001 |
| Type 3 | 00000010 |
| Type 4 | 00000011 |
| Type 5 | 00000100 |
| Type 6 (Data) | 00000101 |
| Type 6 (Voice) | 11111101 | designated. (The message type fields are encoded as shown in Table 4. The ASCII encoded version of Sender/Target license plate numbers is used such as shown in the examples of Table 3 [4g].

8. Fragment the completed message, and forward fragments to the encryption device [4h].
9. Receive encrypted fragments from encryption device. Combine fifty blocks nominally and send to link control processor together with BCDIC encoded version of Sender/Target license plate numbers such as shown in the examples of Table 3 and the message Type field as encoded in Table 4 [4i].

The message formats for each of the message types are shown in FIG. 14 and are as follows:

Type 1:
SOH (1 Octet)/Message Length (2 Octets)/Target License Plate Number (6 Octets)/Sender License plate Number (6 Octets)/Message Type Description (1 Octet)/STX/Sender Vehicle Description (Up to 41 Octets)/ETX/Sender Name (Up to 25 Octets)/ETX/Sender Telephone Number (10 Octets)/ETX/Personal Message(Optional) (Up to 180 Octets)/ETX (1 Octet)

Type 2:
SOH (1 Octet)/Message Length (2 Octets)/Target License Plate Number (6 Octets)/Sender License Plate Number (6 Octets)/Message Type Description (1 Octet)/STX/Sender Vehicle Description (Up to 41 Octets)/ETX/Personal Message (Up to 180 Octets)/ETX (1 Octet)

Type 3:
SOH (1 Octet)/Message Length (2 Octets)/Target License Plate Number (6 Octets)/Sender License Plate Number (6 Octets)/Message Type Description (1 Octet)/STX/Sender Vehicle Description (up to 41 Octets)/ETX/Travel Directions Request (Up to 180 Octets)/ETX (1 Octet)

Type 4:
SOH (1 Octet)/Message Length (2 Octets)/Target License Plate Number (6 Octets)/Sender License Plate Number (6 Octets)/Message Type Description (1 Octet)/STX/Sender Vehicle Description (Up to 41 Octets)/ETX/Personal Voice Message (Up to 12,000 Octets)/ETX (1 Octet)

Type 5:
SOH (1 Octet)/Message Length (2 Octets)/Pseudo License Plate Number "TBROAD" (6 Octets)/Reserved (4

Octets)/Metro Region Code & Zone Code (2 Octets)/ Message Type Description (1 Octet) /STX/ETX/Traffic Report (Up to 180 Octets)/ETX (1 Octet)

Type 6:

SOH (1 Octet) /Message Length (2 Octets)/Target License Plate Number (6 Octets)/Sender License Plate Number (6 Octets)/Message Type Description (1 Octet)/STX/Signalling Message (1 Octet)/ETX (1 Octet)

where SOH, STX and ETX are ASCII characters designating the start of header, start of text, and end of text, respectively.

When operating in the SEND/RECEIVE mode, the communications control processor will only accept and process responses to direct addressed messages received from the Target device engaged. By contrast, all responses to a broadcast message addressed to the Sender device will be accepted. RECEIVE processing is described in the following section.

5.1.2.3 (Send)/Receive

This section emphasizes the Receive capabilities of the communications control processor for the Send/Receive mode. The inbound processing functions performed by the communications control processor are as follows:

1. Segment encrypted message contents received from link control processor. Forward segments to encryption unit. Accept decrypted message segments from encryption unit, reassemble message and store message in memory unit [5a].
2. Parse message into fields [5b].
3. Evaluate destination license plate number to insure that it matches that of Sender device. If not, halt any further processing of message and allow message frame to be overwritten [5c].
4. Signal message processor that message response has been received [5d], indicating both the message type and its location within the memory storage unit.

5.1.2.4 Listen/(Respond)

This section emphasizes the Listen [6] capabilities of the communications control processor for the Listen/Respond mode. Upon device initialization, the communications control processor uses a group of characters of the vehicle license plate number to identify its own encryption key from the key table [3]. This key is to be used whenever the device is acting in the LISTEN/RESPOND (i.e., TARGET) mode.

The inbound processing functions performed by the protocol are as follows:

1. Segment encrypted message contents received from link control processor. Forward segments to encryption unit. Accept decrypted message segments from encryption unit, reassemble message and store message in memory storage unit [6a].
2. Evaluate destination license plate number to insure that it either matches that of the Target device [6b] or the Broadcast pseudo license plate number. If not, halt any further processing of message and allow message frame to be overwritten. Otherwise, continue processing.
3. Evaluate Sender's license plate number [6c].
4. Resolve message frames received from different Senders [6d]. (Note: It may be possible for the communications control processor of the Target device to receive message frames from multiple Senders if the link control processor does not filter them. These will be managed in separate buffer areas by using the Sender address and frame sequence numbers to resolve and acknowledge them.)
5. Parse message into fields [6e].
6. Evaluate message type. If message is a Type 1, and AUTO flag is set, immediately forward a AUTO response control signal to the communications control processor Respond function. Follow Respond process as described in Section 5.1.2.5, otherwise skip this Step [6f].
7. Alert message processor as to receipt of message [6g], indicating both the message type and its location within the memory storage unit.

5.1.2.5 (Listen)/Respond

This section emphasizes the Respond [7] capabilities of the communications control processor for the Listen/Respond mode. Upon receipt of AUTO or Manually entered response control signal, the communications control processor does the following:

1. Retrieve ASCII encoded message fields from device memory for message type indicated [7a].
2. Convert the six character Sender license plate number to binary coded decimal interchange code (BCDIC) (36 bits) from ASCII (48 bits), while preserving the ASCII format [7b]. If fewer than six characters are used in the license plate number as is the case for certain vanity plates, then stuff the unused character fields with zeros. If more than six characters are used, then limit the representation to only the first six characters. Table 3 shows two examples of binary encoded license plate numbers.
3. For a reply to a direct addressed message, map the first two characters of the Target license plate number to a single encryption key contained within a pre-stored table of keys using the key selection algorithm described in Section 4.2.2.1. (Table 1 shows an example of a mapping between the first two characters of a license plate and a group of $36^2$ keys.) For a reply to a broadcast message, map the first two characters of the Sender license plate number to a single encryption key. This is the preferred approach though many other possibilities exist [7c].
4. Forward selected key to the encryption device [7d].
5. For a reply to a direct addressed messages, map the first character of the Target license plate number to a single frequency channel contained within a pre-stored table of allocated frequency channels using the frequency channel selection algorithm described in Section 4.2.3. For a reply to a broadcast message, map the first character of the Sender license plate number to a single frequency channel [7e]. (Table 2 shows an example of a mapping between the first character of a license plate number and a group of only eight frequency channels.) It is impossible to predict the number of channels that could be made available for this system by the FCC, however it is suspected that the number will be small. The preferred approach therefore uses only the first character of the license plate number. Any of the other character positions would equally suffice except for the latter ones which are sometimes absent in special vanity plates.
6. Forward selected frequency channel to the RF unit [7f].
7. Build a message formatted in accordance with the message Type designated. (The message types are encoded as shown in Table 4. Use ASCII encoded version of Sender/Target license plate numbers such as shown in the examples of Table 3 [7g].

8. Fragment the completed message, and forward fragments to the encryption device [7h].

9. Receive encrypted fragments from encryption device. Combine fifty blocks nominally and send to link control processor (LLC) together with BCDIC encoded version of Sender/Target license plate numbers as shown in the examples of Table 3, and the message type field as encoded in Table 4 [7i].

5.1.2.6 Set-Up Circuit Initiate/(Respond)

This section emphasizes the Initiate procedure used by the Sender communications control processor to configure a full-duplex CDMA circuit with a Target device in the Set-Up Circuit Initiate mode [8]. Upon detection of a Set-Up Circuit Request message from the message processor [8a], the Sender's communications control processor will perform the following functions:

1. Read the Circuit Type: Data or Voice [8b].
2. Verify that a CDMA circuit is not already in operation [8c]. If a circuit is in operation already, a Circuit Denial message will be returned to the message processor [8d] and the Listen/(Respond) mode will be entered [8e]. A busy signal will also be sent to the audio amplifier if a voice circuit is being requested.
3. If no circuit is already in operation, use the Send/Receive packet mode to send a "Call Set-Up Request" Type 6 packet to the Target device [8f]. This packet includes the Sender address and the circuit type: data or voice. All but Type 6 responses will now be filtered out of the packet receive channel [8g] for the duration of the circuit.
4. Read the Type 6 response from the Target [8h]. If the response is a Call Set-Up Denial message, then return a "Circuit Denial" message to the message processor (MP) [8i]; if a voice circuit had been requested, return a busy signal to the audio amplifier [8j]; enter the Listen/(Respond) mode [8k].
5. If the response from the Target is a "Call Set-Up Affirm" message, then return a "Call Set-up In Progress" message to the local MP [8l]; if a voice circuit had been requested, send a ring signal to the audio amplifier [8m].
6. Identify the CDMA codes and frequency band of operation to be used for establishment of the full-duplex circuit using the algorithm described in Section 4.2.3. Forward each CDMA code designator to its CDMA modulator and demodulator over control lines. Forward frequency band information to the wideband transmitter/receiver over control lines [8n].
7. Identify the common session key for circuit encryption/decryption to be used for the full-duplex channel based on the algorithm described in Section 4.2.2.3. Forward this key to the encryption unit [8o].
8. Send a Sync Message Sequence to the synchronous data link control processor input for transmission to the Target [8p]. Monitor the synchronous data link output for the Sync Message Sequence being sent by the Target [8q]. {The Sync Message Sequence will be received once the Sender demodulator has successfully acquired the code.}
9. When Sync Message Sequence is received from Target, respond by sending a Completed Sync Message Sequence back to the Target [8r].
10. Wait until a Completed Sync Message Sequence is received from the Target (i.e., State 4 in FIG. 13 is reached) [8s]. {Once the Target demodulator has successfully acquired the code, it responds by sending a Completed Sync Message Sequence also}.

Figure 13:
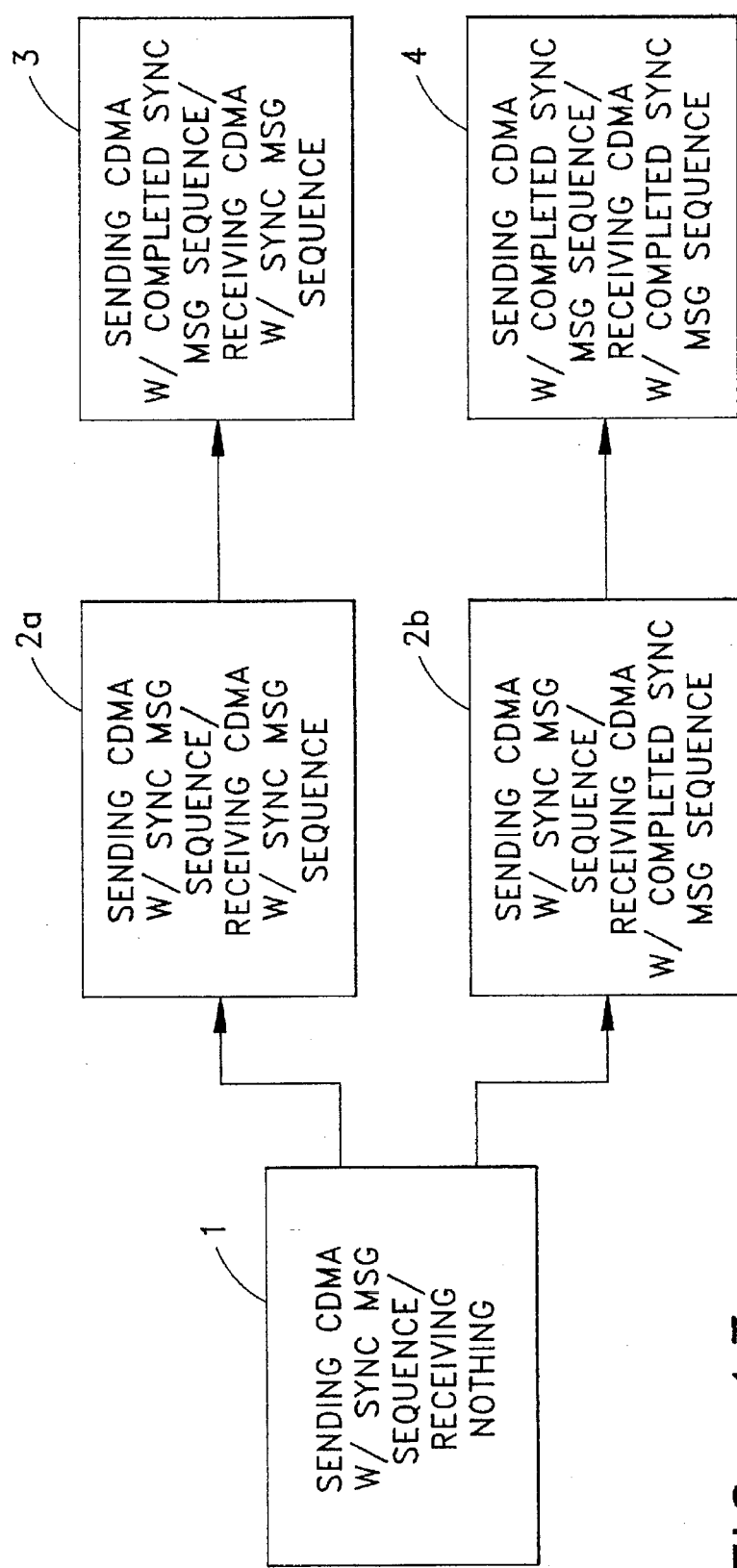
FIG. 13 is the circuit acquisition state diagram for the invention.

FIG. 13 is a state diagram portraying all of the possible synchronization states that the Sender device could be in before complete full-duplex synchronization (i.e., State 4) is attained. The CCP will be able to respond to each state until State 4 is attained. Two different state paths to synchronization can occur. For the first possibility, the device enters State 1; a sync message sequence is being sent but nothing is being received. Then State 2b is entered; a sync message sequence is being sent, and a completed sync message sequence is being received. In response the device enters State 4; a completed sync message sequence is sent and is also being received. For the second possibility, the device enters State 1. Then State 2a is entered; a sync message sequence is being sent and is also being received. The device responds by entering State 3; a completed sync message sequence is being sent while a sync message sequence is being received. Finally, the fourth and final State 4 is reached.

11. Once State 4 is reached, open direct connection to the KDU or voice processor based on the circuit type completed [8t]. Notify the message processor with a Circuit Ready message. In addition, for a voice circuit, halt the ring signal [8u].
12. Monitor the direct addressed packet channel for a Type 6 Connection Release message from the Target [8v]. Upon detection of such, return a Type 6 Release Acknowlegment message [8w].
13. Monitor "Release Signal" interrupt signal from the local MP, and a "Loss of Sync" signal from the CDMA modem [8x]. In response to either, send a Type 6 Connection Release message packet to the Target. Await a Release Acknowledgement message from the Target [8y].
14. Send a "Connection Release" command signal to the MP [8z]. Close the connection to the KDU or voice processor, depending on the circuit type being dropped [8za]. Enter the Listen/(Respond) packet mode [8zb].

5.1.2.7 Set-Up Circuit (Initiate)/Respond

This section emphasizes the Respond procedure used by the Target communications control processor to configure a full-duplex CDMA circuit with a Sender device in the Set-Up Circuit Respond mode [9]. This mode is entered from the default Listen/(Respond) mode. Upon detection of a Call Set-Up Request Type 6 packet in the Listen mode, the Set-Up Circuit Respond mode is entered [9a]. The Target communications control processor will perform the following functions:

1. Read the Circuit Type: Data or Voice [9b].
2. Verify that a CDMA circuit is not already in operation [9c]. If a circuit is in operation already, a "Call Set-Up Denial" message will be returned to the Sender, using a Type 6 message packet, via the Respond mode [9d]. The Listen/(Respond) mode will then be entered [9e].
3. If no circuit is already in operation, use the Respond mode to send a "Call Set-Up Affirm" Type 6 message packet to the Sender device [9f]. This packet includes the Target address and the circuit type: data or voice. All but Type 6 responses will now be filtered out of the packet receive channel [9g] for the duration of the circuit.

4. Identify the CDMA codes and frequency band of operation to be used for establishment of the full-duplex circuit using the algorithm described in Section 4.2.3. Forward each CDMA code designator to its CDMA modulator and demodulator over control lines. Forward frequency band information to the wideband transmitter/receiver over control lines [9h].
5. Identify the common session key for circuit encryption/decryption to be used for the full-duplex channel based on the algorithm described in Section 4.2.2.3. Forward this key to the encryption unit [9i].
6. Send a Sync Message Sequence to the synchronous data link control processor input for transmission to the Sender [9j]. Monitor the synchronous data link output for the Sync Message Sequence being sent by the Sender [9k]. {The Sync Message Sequence will be received once the Target demodulator has successfully acquired the code.}
7. When Sync Message Sequence is received from Sender, respond by sending a Completed Sync Message Sequence back to the Sender [9l].
8. Wait until a Completed Sync Message Sequence is received from the Sender (i.e., State 4 in FIG. 13 is reached) [9m]. {Once the Sender demodulator has successfully acquired the code, it responds by sending a Completed Sync Message Sequence also}.

FIG. 13 is a state diagram portraying all of the possible synchronization states that the Target device could be in before complete full-duplex synchronization (i.e., State 4) is attained. The CCP will be able to respond to each state until State 4 is attained. Two different state paths to synchronization can occur. For the first possibility, the device enters State 1; a sync message sequence is being sent but nothing is being received. Then State 2b is entered; a sync message sequence is being sent, and a completed sync message sequence is being received. In response, the device enters State 4; a completed sync message sequence is sent and is also being received. For the second possibility, the device enters State 1. Then State 2a is entered; a sync message sequence is being sent and is also being received. The device responds by entering State 3; a completed sync message sequence is being sent while a sync message sequence is being received. Finally, the fourth and final State 4 is reached.

9. Once State 4 is reached, open direct connection to the KDU or voice processor based on the circuit type completed [9n]. Notify the local message processor with a Circuit Ready message. In addition, for a voice circuit, forward a ring signal to the ring signal generator for a one second duration [9o].
10. Monitor the direct addressed packet channel for a Type 6 Connection Release message from the Sender [9p]. Upon detection of such, return a Type 6 Release Acknowlegment message [9q].
11. Monitor "Release Signal" interrupt signal from the local MP, and a "Loss of Sync" signal from the CDMA modem [9r]. In response to either, send a Type 6 Connection Release message to the Sender. Await a Release Acknowledgement message from the Sender [9s].
12. Send a "Connection Release" command signal to the MP [9t]. Close the connection to the KDU or voice processor, depending on the circuit type being dropped [9u]. Enter the Listen/(Respond) packet mode [9v].

5.1.2.8 Set Broadcast Receiver

This section emphasizes the procedure used by the communications control processor for configuring the broadcast receiver in the Set Broadcast Receiver mode [10]. Upon detection of the Set Broadcast Receiver message from the message processor, the communications control processor will perform the following functions:

1. Retrieve ASCII encoded broadcast receiver address from device memory storage unit. Read the address [10a].
2. Determine whether the address is the traffic report broadcast address, TBROAD [10b]. If it is then also retrieve the metropolitan region code and regional zone code; forward both codes to the communications control processor to enable filtering of message from outside of region/zone [10c].
3. Convert the six character pseudo license plate number to binary coded decimal interchange code (BCDIC) (36 bits) from ASCII (48 bits). Forward the BCDIC broadcast receive address to the packet (LLC) link control processor [10d].
4. Map a character of the pseudo license plate number to a single frequency channel contained within a pre-stored table of the allocated frequency channels using the frequency channel selection algorithm described in Section 4.2.3. Forward selected frequency channel to the broadcast receiver to configure channel setting [10e].
5. Map a group of characters from the pseudo license plate number to a single encryption key contained within a pre-stored table of keys by using the key selection algorithm described in Section 4.2.2.1. Forward selected key to the encryption device (broadcast channel) [10f].
6. The Broadcast receiver is now in the configured state [10g].

5.1.3 Encryption Unit Operation

The encryption unit operates at the lowest level of the Application layer. It uses a standard data encryption standard (DES) algorithm, and requires only knowledge of the appropriate 56-bit key to use for message encryption. It accepts only 64-bit (i.e., 8 octet) message segments. The encryption unit processors are based on an Analog Devices ADSP 2111 device. The encryption unit contains four such processors to support the highest usage demand extent under full-duplex circuit operation, with concurrent receipt of signalling messages.

The communications control processor will segment outbound messages into 64-bit segments for acceptance by the encryption unit processor. {It will also segment in-bound message frames from the link control unit prior to routing them to the encryption unit for decryption.} The encryption unit will use the designated session key together with the DES algorithm to encrypt the message segments for protected transmission. (The key will be forwarded to the unit in advance of an outbound message by the local communications control processor.)

{When the device is acting in the Sender role, the unit will always use the session key of the Target device to both send and receive messages. When the device is acting in a Target role the encryption unit will always use the Target's own session key to both listen and respond to messages. The only exception is for broadcast messages. For these, the Sender device uses the session key corresponding to the selected broadcast address to send messages, while the Target device uses the same session key to receive broadcast messages. The Target device then uses the session key of the Sender for issuing a reply.}

The encryption unit will forward the encrypted message segments to the communications control processor. The communications control processor will receive the outbound encrypted segments from encryption device. For packet messages, the communications control processor will combine fifty blocks nominally into a frame and send the frame to the packet link control processor (LLC) together with a header containing: 1) the BCDIC encoded version of Sender/Target license plate numbers as shown in the examples of Table 3, and 2) the message type encoded as shown in Table 4. For communications circuits, the communications control processor will directly forward only the encrypted segments to the synchronous link control processor.

The dual channel encryption unit of the Target device will use both a 56-bit selected broadcast session key as well as its own personal session key, designated for that device by the local communications control processor, to decrypt both the in-bound broadcast and direct addressed cypher-text packet message segments, respectively. These are received from the communications control processor which segments the in-bound frames received from the packet link control processor (LLC). (The two 56-bit keys will be forwarded to the unit by the communications control processor following device power-up.) The decrypted message segments will be forwarded back to the communications control processor. The communications control processor will reassemble the message from these incoming segments. For communications circuits, the encryption channel normally used to decrypt packet broadcast messages will be used when required to support full-duplex circuit encryption and decryption while the alternate channel will be used for concurrent receipt of packet signalling messages. The DES encryption processors supporting circuit encryption and decryption will each receive the same 56-bit key from the communications control processor based on the algorithm described in section 4.2.2.3.

5.1.3.1 Key Management

The communications control processor employs a table of encryption keys used to determine the appropriate encryption key for establishing secure communication with another device. It does this using the algorithms described in Section 4.2.2. These keys should be changed on at least an annual basis. The tables are stored in read-only-memory (ROM) devices, and mounted via a socket on a processor board. These will be updated annually, for a fee, by mailing each device owner a new ROM chip to replace the old chip.

5.2 Data Link Layer

5.2.1 Packet Link Control Software (LLC)

The IV-PDCD packet logical link control processing will be implemented using a customized version of commercially available station Class 4 ISO 8802-2 Logical Link Control (LLC) software. The device will use a dynamic implementation of the data link control protocol to accomodate the variations in message length for the message Types generated by the device. For Type 1, 2, 3, 5, and 6 messages as defined in Section 5.1.2.2, which are considered to be short messages (i.e., 400 octets nominal), the form of service used will be Type 3, acknowledged connectionless service. (NOTE: The IV-PDCD messages are defined by Types, as are the services provided by the IEEE 802.2 protocol. These different usages of the word "Type" should not be confused.) For Type 4 messages, as defined in Section 5.1.2.2, which will be of considerable length (i.e., 10,000 octets nominal), the form of service used will be Type 2, acknowledged connection-mode service. Both Types of service employ both flow control as well as error control. Type 3 service uses stop-and-wait flow control and stop-and-wait ARQ error control. Type 2 service uses sliding window flow control (with a window size of 8) and go-back-N ARQ error control.

The LLC Frame is as shown in FIG. 16. The 8-bit destination service access point (DSAP) field will be used to identify the IV-PDCD message Type. The message types are encoded as shown in Table 4. The protocol will be modified to interpret the message Type from the DSAP to determine the Type of DLC service to be used. The SSAP will not be used. It will be stuffed with 0 bits, and considered reserved for future use. The information field will nominally contain 400 octets for all message Types. This equates to 50 DES encrypted information blocks per LLC frame.

Figure 17:
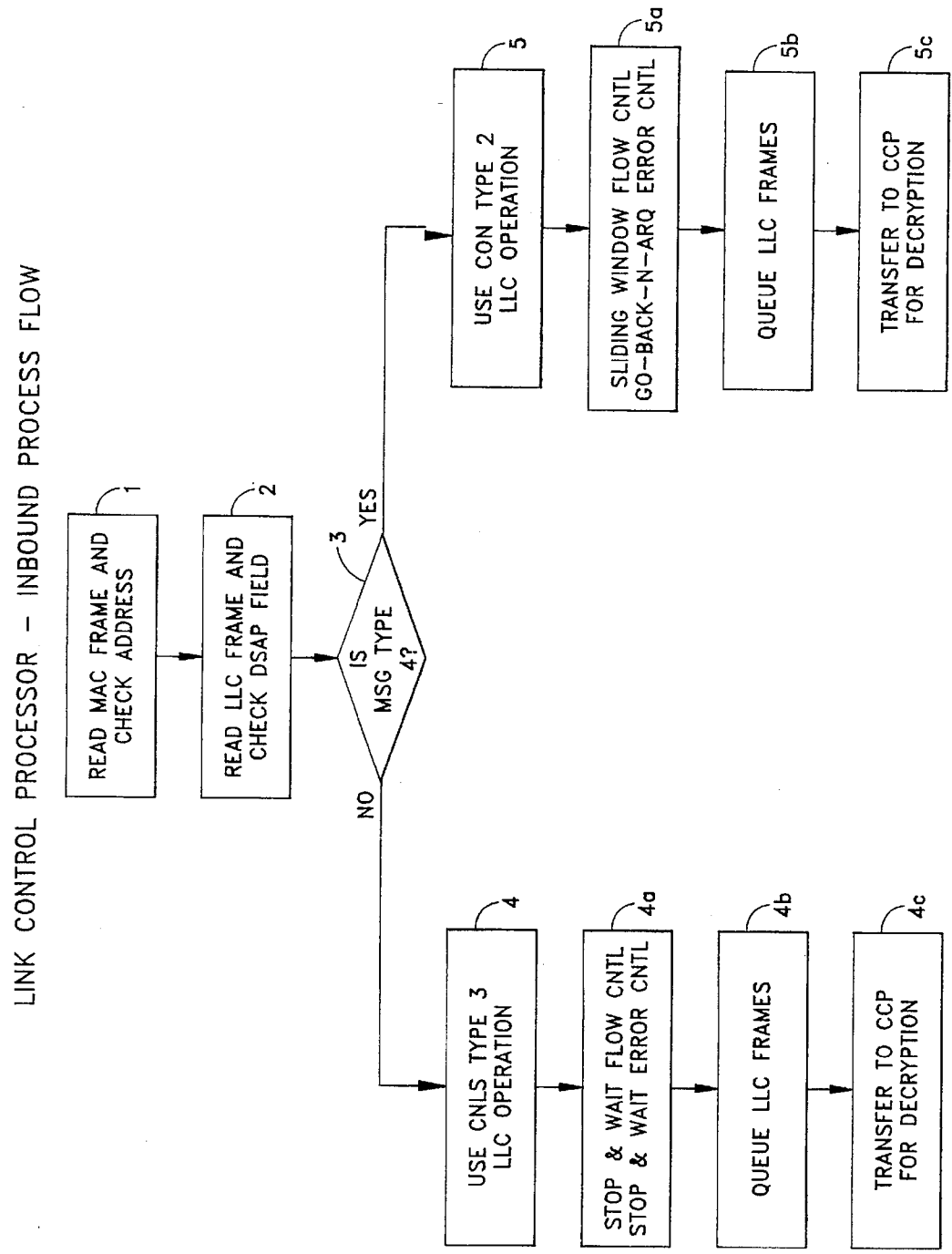
FIG. 17 is a high level process flow diagram, for inbound message flow, used by the Link Control Processor (LLC) of the invention.

FIG. 17 shows the inbound receive process flow for the major functions of the link control processor:

1. The MAC layer processing reads the MAC frame and performs address checking. It routes all valid frames to the LLC [1].
2. The LLC processing reads the LLC frame, checking the DSAP field for the message type [2].
3. The DSAP field is checked to determine whether the frame belongs to a Type 4 message [3]. If yes, go to Step 5, otherwise go to Step 4.
4. If the message is other than a Type 4 message, then connectionless (CNLS) with acknowledgement, or type 3 LLC operation is used [4]. Stop-and-Wait flow control and Stop-and-Wait ARQ error control are employed [4a]. The LLC frames are stored in a queue [4b] and then transferred to the communications control processor for decryption [4c].
5. If the message is a Type 4 message then connection-oriented (CON) type 2 LLC operation is used. This involves using CON protocol primitives to first establish a connection [5]. Sliding window flow control and Go-Back-N ARQ error control are employed [5a]. The LLC frames are stored in a queue [5b] and then transferred to the communications control processor for decryption [5c].

Figure 18:
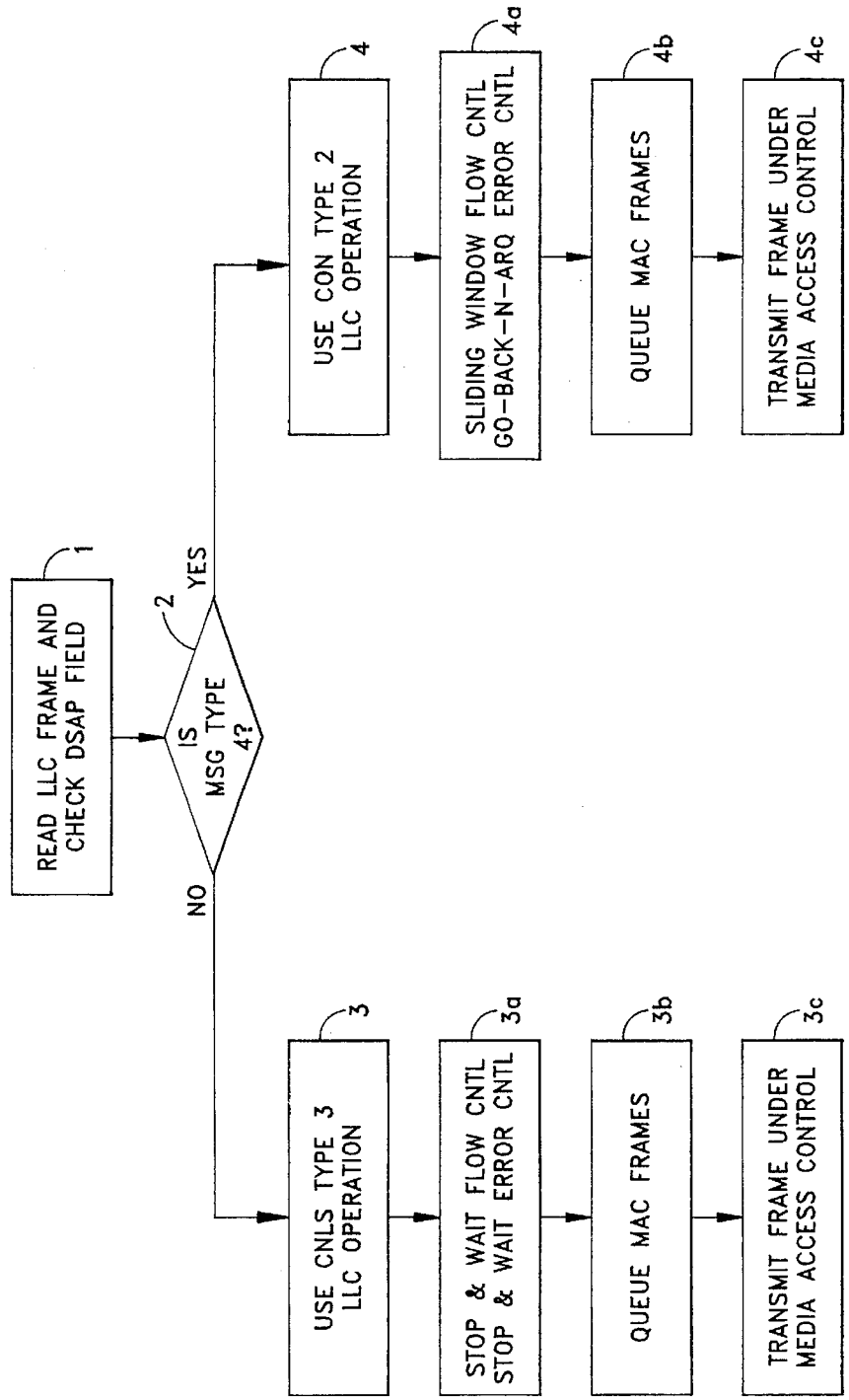
FIG. 18 is a high level process flow diagram, for outbound message flow, used by the Link Control Processor (LLC) of the invention.

FIG. 18 shows the outbound send process flow for the major functions of the link control processor:

1. The LLC processing reads the LLC frame, checking the DSAP field for the message type [1].
2. The DSAP field is checked to determine whether the frame belongs to a Type 4 message [2]. If yes, go to Step 4, otherwise go to Step 3.
3. If the message is other than a Type 4 message, then connectionless (CNLS) with acknowledgement, or type 3 LLC operation is used [3]. Stop-and-Wait flow control and Stop-and-Wait ARQ error control are employed [3a]. The MAC frames are stored in a queue [3b] and then transmitted under control of the MAC protocol [3c].
4. If the message is a Type 4 message then connection-oriented (CON) type 2 LLC operation is used. This involves using CON protocol primitives to first establish a connection [4]. Sliding window flow control and Go-Back-N ARQ error control are employed [4a]. The MAC frames are stored in a queue [4b] and then transmitted under control of the MAC protocol [4c].

5.2.2 Media Access Control Software

The IV-PDCD packet media access control processing will be implemented using a customized version of commercially available ISO 8802-3 Media Access Control (MAC) software. The Intel 82592 Advanced CSMA/CD LAN controller forms an integral part of the implementation as described in Section 3.2.

The MAC frame is depicted in FIG. 16. The MAC frame will incorporate 48 bit (6 Octet) destination/source address fields. Both address field formats incorporate a I/G bit and a U/L bit in their first two bit positions. In both cases the I/G bit will be set to 1 to designate an individual, rather than a group address; the U/L bit will be set to 0 to designate a locally, rather than globally, administered address. Use of these special bits thereby limits the effective field length to 46 bits. If the six character vehicle license plate numbers were encoded in ASCII, there would be insufficient bits for the resultant 48 bit field. The approach used to resolve this dilema is to encode each of the six characters of the license plate using a six-bit binary coded decimal interchange code (BCDIC), and to stuff the two high order bit positions for each of the six characters, except the first which incorporates the I/G and U/L bits, with two "0" bits. This task will in fact be performed by the communications control processor which will forward the BCDIC encoded source and destination addresses and message type designator to the data link layer together with fifty encrypted blocks nominally.

On transmission, the Intel 82592 controller will accept DLC frames from the link control processor and will assemble a MAC frame containing source/destination addresses and error detection fields (A 32-bit CRC is computed by the MAC).

On reception, the frame will be disassembled, address recognition performed, and errors detected (A 32-bit CRC is computed on the received message by the MAC and compared with the 32-bit CRC computed on transmission. Bad frames are dropped.)

Packet communications over a transmission channel will be established by a digital modem unit and RF unit controlled by the link control unit which contains a carrier sense multiple access controller with collision detection, similar or equivalent to that described in the IEEE 802.3 standard specification.

5.2.3 Synchronous Link Control Software

The IV-PDCD logical link control processing for CDMA circuits will be implemented using customized synchronous link control software. The circuit link control processing consists of a rudimentary, synchronous data link control protocol for real-time processing. It is a modified version of HDLC, having neither addressing and control fields, nor frame check sequences. This customized protocol injects flag sequences, for bit synchronization, periodically, within the information stream. It also incorporates bit stuffing and destuffing. It is implemented in software within the circuit link control processor.

5.3 Physical Layer

5.3.1 Digital Modem Unit and RF Unit

Several media possibilities exist for the implementation of the physical layer. Among these are UHF radio, microwave radio, and infra-red media. The preferred media is UHF radio. In the preferred design, the physical layer is implemented with a digital modem unit and an RF unit. The digital modem unit consists of a PSK modem, and a spread spectrum CDMA modem. The RF unit consists of a narrowband transmitter/receiver, and a spread spectrum wide band transmitter/receiver.

The PSK modem and narrowband transmitter/receiver are controlled by MAC interface commands from the CSMA link control (MAC) processor and use the bit stream passed from the link control processor to modulate a signal, and transmit the resultant waveform. The digital modem employs PSK modulation. The data-rate is on the order of 9600 bps. The transmitter power for the RF unit is on the order of 100 milli-watts or less.

The spread spectrum CDMA modem and wideband transmitter/receiver are controlled by commands from the communications control processor and use the bit stream passed from the synchronous link control processor to modulate a signal, and transmit the resultant waveform. The information data-rate is on the order of 9600 bps. The spread spectrum modem modulo-two combines the outgoing bit stream with the specified direct sequence pseudo random code; it then PSK modulates the resultant bit stream at an intermediate frequency. The transmitter upconverts the waveform to the radio frequency and amplifies the resultant signal. The transmitter power for the RF unit is on the order of 100 milli-watts or less.

The RF unit will amplify and downconvert any incoming signals to an intermediate frequency (IF). The digital modem unit will demodulate the received signals at IF and pass the resultant bit stream to the appropriate link control processor.

6. CONCLUSION

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. A visual network access method for providing two-way communications of digital information signals between geographically separate and distinct entities over an electromagnetic medium;

each said entity having been preassigned its own unique alphanumeric identifier;

each said alphanumeric identifier consisting of a multiplicity of alphanumeric characters;

each said alphanumeric identifier being displayed on an object in close proximity to its associated entity and visible to the human eye from neighboring entities;

said visual network access method accepts input from a human operator associated with a local Sender entity, of the unique alphanumeric identifier associated with any one of said neighboring entities to which communications is being Targeted, as visually sighted by eyes of said operator;

said visual network access method uses said alphanumeric identifier, associated with the Target neighboring entity, together with the alphanumeric identifier associated with the local Sender entity, to determine the communications parameters required for establishment of two-way communications between said Sender and said Target entities;

said visual network access method consisting of the following method steps:

said Sender entity reading operator-entered Target alphanumeric identifier;

said Sender entity grouping together a predetermined number of alphanumeric characters at preselected positions of said Target alphanumeric identifier;

said Sender entity translating the alphanumeric character group into an equivalent decimal number;

said Sender entity using said decimal number to index a table of prestored numbers to identify the value of a specific communications parameter required to access said Target entity;

said Sender entity forwarding said value of said communications parameter to the communications subsystems associated with said communications parameter resident within said Sender entity to configure said communications subsystems for communications with said Target entity;

said Sender entity repeating the last four method steps to identify values for each of said communications parameters required by each of said Sender entity communications subsystems to access said Target entity;

said Sender entity translating said Target alphanumeric identifier into an equivalent binary address;

said Sender entity using said binary address to identify the destination address for packet messages sent to said Target entity;

said Sender entity translating said local Sender alphanumeric identifier into an equivalent binary address;

said Sender entity using said binary address to identify the origination address for packet messages sent to said Target entity;

said Sender entity sending message packets to said Target entity using Sender communications subsystems configured with selected communications parameter values;

said message packets containing: said binary destination address, said binary origination address, said Sender alphanumeric identifier, and said Target alphanumeric identifier;

said Target entity receiving said message packets and parsing contents thereof;

said Target entity using said Sender alphanumeric identifier to select the communications parameter values for returning messages to the Sender entity by means of the following steps:

said Target entity grouping together a predetermined number of alphanumeric characters at preselected positions of said Sender alphanumeric identifier;

said Target entity translating the alphanumeric character group into an equivalent decimal number;

said Target entity using said decimal number to index a table of prestored numbers to identify the value of a specific communications parameter required to access said Sender entity;

said Target entity forwarding said value of said communications parameter to the communications subsystems associated with said communications parameter resident within said Target entity to configure said Target communications subsystems for communications with said Sender entity;

said Target entity repeating the last four method steps to identify values for each of said communications parameters required to access said Sender entity;

said Target entity translating said Target alphanumeric identifier into an equivalent binary address;

said Target entity using said binary encoded Target address as the origination address for packet messages sent to said Sender entity;

said Target entity translating said Sender alphanumeric identifier into an equivalent binary address;

said Target entity using said binary encoded Sender address as the destination address for packet messages sent to said Sender entity;

said Target entity sending message packets to said Sender entity using Target communications subsystems configured with selected communications parameter values;

said message packets containing: said binary destination address, said binary origination address, said Sender alphanumeric identifier, and said Target alphanumeric identifier;

said Sender and said Target entities establishing a full-duplex communications link upon exchange of message packets.

2. A visual network access method, according to claim 1, comprised of a message processor method, a communications control processor method, and a link control processor method.

3. A visual network addressing method according to claim 2, wherein said message processor interfaces with a keyboard and display unit, a voice processing unit, a memory storage unit and said communications control processor to provide a method for device operation and control using a message processor said method comprising the steps of:

said message processor generates a menu driven user interface on the display screen of said keyboard and display unit; said message processor operates in the mode selected by the device user;

in the INITIALIZE mode said message processor method prompts the user for information required to initialize the device including user name, user telephone number, vehicle license plate number, vehicle model, vehicle color, vehicle model year, time and date setting; the message processor method informs said communications control processor method of this non-communications mode;

in the SEND/RECEIVE mode said message processor method provides processing to enable the user to assign the device a Sender role enabling it to send directed and broadcast packet messages to Target devices and to process the responses from Target devices to which packet messages have been directed; the message processor method solicits visual network access information for the Target vehicle from the device user, in the form of a Target vehicle license plate number, to support functions of said communications control processor method; the message processor method prompts the user to select one of four sub-menus commensurate with building one of four user configurable message types, namely a Type 1, Type 2, Type 3, or Type 4 message; in accordance with the message type selection input from user, the processor creates a message template for the display screen which guides the user in building the message type selected; said message processor method processes received messages for display in a format commensurate with the message type received; said message processor method forwards voice messages to said voice processing unit; said message processor method informs said communications control processor method of SEND/RECEIVE mode of operation for proper device set up; said SEND/RECEIVE mode also supports call signaling method, by means of generating control message packets, for the SET-UP CIRCUIT INITIATE/RESPOND mode;

in the LISTEN/RESPOND mode said message processor method provides processing to enable the device user to assign the device to a Target role enabling it to listen for directed and broadcast packet messages forthcoming from other devices acting in a Sender role, and to build and control the release of responses to received messages; said message processor method informs said communications control processor method of said LISTEN/RESPOND mode of operation for proper device set up; said LISTEN/RESPOND mode supports call signaling method, by means of receipt and generation of control message packets, for said SET-UP CIRCUIT INITIATE/RESPOND mode;

in said SET-UP CIRCUIT INITIATE/RESPOND mode said message processor method provides processing to enable the device user to establish a full-duplex digital communications circuit with a Target device; the message processor method informs said communications control processor method of SET-UP CIRCUIT INITIATE/RESPOND mode of operation for proper device set up;

in the SET BROADCAST RECEIVE mode said message processor method provides processing to enable the device user to configure the packet broadcast receiver address, and to identify the metropolitan region and regional zone if the traffic broadcast address is selected; said message processor method informs said communications control processor method of SET BROADCAST RECEIVE mode of operation for proper device set up;

in the PRE-STORE MESSAGES mode said message processor method provides processing to enable the device user to pre-store data and voice messages in a buffer; these messages can be used in composing any of the four message types; said message processor method informs said communications control processor method of said PRE-STORE MESSAGES mode of operation;

in the MESSAGE REVIEW mode said message processor method provides processing to enable the device user to scroll through the pre-stored messages obtained in said PRE-STORE MESSAGES mode, and received messages obtained in said SEND/RECEIVE mode and said LISTEN/RESPOND mode, and to select a message by an identification number indicative of its position in the buffer; said message processor method informs said communications control processor method of said MESSAGE REVIEW mode of operation;

said message processor method generates a menu driven user interface on the display screen of said keyboard and display unit to enable a device user to efficiently compose and/or transfer each of the following packet message types, except Type 6, while operating in said SEND/RECEIVE, and said LISTEN/RESPOND modes, and only Type 6 packet messages while operating in said SET-UP CIRCUIT INITIATE/RESPOND mode:

the Type 1 message enables the user to exchange telephone numbers with a Target device; these messages comprise the following information: user name, vehicle model, vehicle color, vehicle model year, vehicle license plate number, user telephone number, and an optional personal message; said message processor method notifies said communications control processor method as to the position of the AUTO/MANUAL mode switch located on said keyboard and display unit; the release of responses to a Type 1 message by said communications control processor method of a Target device will be performed automatically if said AUTO/MANUAL mode switch is in the AUTO position, and manually by device user via message processor method if said switch is in the MANUAL position;

the Type 2 message enables the user to exchange personal data messages with a Target device; these messages comprise the following information: vehicle model, vehicle color, vehicle model year, vehicle license plate number, and a personal message; responses to Type 2 messages are released only by manual intervention of the Target device user;

the Type 3 message enables the user to exchange travel directions messages with a Target device; these messages comprise the following information: vehicle model, vehicle color, vehicle model year, vehicle license plate number, and a travel information message; responses to Type 3 messages are released only by manual intervention of the Target device user;

the Type 4 message enables the user to exchange voice messages with a Target device; these messages comprise the following information: vehicle model, vehicle color, vehicle model year, vehicle license plate number, and a personal voice message; responses to Type 4 messages are only released only by manual intervention of the Target device user;

the Type 5 message enables the user to receive packetized traffic reports from a central broadcast terminal; the traffic report packets contain a metropolitan region and a regional zone code to allow filtering by the communications control processor method;

the Type 6 message enables the user to initiate said call signaling method for establishment and tear-down of CDMA circuits.

4. A visual network access method according to claim 2, wherein said link control processor method interfaces with said communications control processor method and a digital PSK modem means to provide a method of packet communications using a LLC/MAC link control processor said link control processor method comprising the steps of:

said link control processor method receives outbound message blocks, address information and message type information from said communications control processor method;

said message type being one of Type 1, Type 2, Type 3, Type 4, Type 5 and Type 6;

said link control processor method formats the outbound message blocks into logical link control, LLC, frames, with 8 bit destination service access point, DSAP, field of LLC frame used to identify the message type; link control processor method stuffs the SSAP field of the LLC frame with zero bits;

said link control processor method stores LLC frames for Type 1, Type 2, Type 3, Type 5 or Type 6 messages in a first outbound service queue; link control processor method implements stop-and-wait flow control and stop-and-wait ARQ error control for the outbound Type 1, Type 2, Type 3, Type 5 and Type 6 messages in accordance with a first Logical Link Control protocol;

said link control processor method stores LLC frames for outbound Type 4 messages in a second outbound service queue; link control processor method uses CON protocol primitives to first establish an outbound connection; link control processor method implements sliding window flow control, with a window size of eight, and go-back-N ARQ error control for outbound Type 4 messages in accordance with a second Logical Link Control protocol;

said link control processor method transfers LLC frames from the first outbound service queue; link control processor method assembles LLC frames into media access control frames containing source and destination addresses, and error detection fields; link control processor method stores outbound MAC frames in outbound MAC queue;

said link control processor method transfers LLC frames from the second outbound service queue; link control processor method assembles LLC frames into media access control frames containing BCDIC encoded source and destination addresses, and error detection fields; link control processor method stores outbound MAC frames in outbound MAC queue;

said link control processor method implements a media access control protocol; link control processor method monitors transmission channel via digital demodulator; link control processor method provides control for channel access via signal sent to said digital modem means; link control processor method forwards MAC frames from MAC queue to said digital modem modulator input;

said link control processor method receives media access control frames from said digital demodulator;

said link control processor method implements the media access control protocol; link control processor method disassembles MAC frames, link control processor method performs address checking; link control processor method performs cyclical redundancy code check on received message; link control processor method stores inbound MAC frames having correct destination address and no message errors within in inbound MAC queue; link control processor method drops MAC frames having either incorrect destination address or message errors; link control processor method reads message type;

said link control processor method implements stop-and-wait flow control and stop-and-wait ARQ error control for inbound Type 1, Type 2, Type 3, Type 5, and Type 6 messages in accordance with the first Logical Link Control protocol; link control processor method stores LLC frames for inbound Type 1, Type 2, Type 3, Type 5, or Type 6 messages in a first inbound LLC queue;

said link control processor method uses CON protocol primitives to first establish an inbound connection for inbound Type 4 messages; link control processor method implements sliding window flow control, with a window size of eight, and go-back-N ARQ error control for inbound Type 4 messages in accordance with the second Logical Link Control protocol; link control processor method stores LLC frames for inbound Type 4 messages in a second inbound LLC queue; and link control processor method forwards LLC frames to said communications control processor method.

5. A visual network access method according to claim 2, wherein said communications control processor method interfaces with said message processor method, a memory storage unit, an encryption unit, said link control processor method, a digital modem unit, and a RF unit to provide a method for communications control using a communications control processor said method comprising the steps of:

said communications control processor method receives mode selection information, visual network access information in the form of a visually-sighted alpha-numeric identifier, and messages from said message processor method; said communications control processor method operates in the mode selected by the device user;

in the INITIALIZE mode said communications control processor method configures said RF unit, said digital modem unit, said link control processor method, and said encryption unit with the frequency channel settings, CDMA codes, data link addresses and broadcast addresses, and session encryption keys, respectively;

in the SEND/RECEIVE mode said communications control processor method provides processing to send directed and broadcast packet messages to Target devices and to process the responses from Target devices to which packet messages have been directed; in said SEND mode, the communications control processor method receives message information, and visual network access information for the device associated with a Target vehicle, from said message processor method, in the form of an alpha-numeric Target vehicle license plate number; the communications control processor method uses this alpha-numeric number to identify the link address and to select an encryption key and frequency channel for packet transmissions with the Target; the communications control processor method may receive any one of four user configurable message types, namely a Type 1, Type 2, Type 3, or Type 4 message; the communications control processor method formats a message frame commensurate with message type selected; the communications control processor method segments the message frame and transfers these to said encryption unit, the communications control processor method reassembles encrypted segments from said encryption unit, the communications control processor method transfers an encrypted message frame to said link control processor method; the communications control processor method forwards link address and message type information to said link control processor method, and frequency information to said RF unit; for said RECEIVE mode the reverse flow of message information is followed; in said SEND/RECEIVE mode, said communications control processor method provides a call signaling method for establishment of CDMA circuit communications, by means of control message packets, for the SET-UP CIRCUIT INITIATE/RESPOND mode;

in the LISTEN/RESPOND mode said communications control processor method provides processing to enable it to listen for directed and broadcast packet messages forthcoming from other devices acting in a Sender role, and to build and control the release of responses to received messages; said communications control processor method is informed of said LISTEN/RESPOND mode of operation by said message processor method for proper device set up; in said LISTEN/RESPOND mode, said communications control processor method provides a call signaling method, by means of control message packets, for said SET-UP CIRCUIT INITIATE/RESPOND mode;

in said SET-UP CIRCUIT INITIATE/RESPOND mode said communications control processor method provides processing to establish a full-duplex digital communications circuit between a Sender and a Target device, including a call signaling method, identification and selection of communications parameters including: encryption codes, CDMA codes, and frequency bands of operation, and a link acquisition/synchronization procedure; said communications control processor method is informed of said SET-UP CIRCUIT INITIATE/RESPOND mode of operation by said message processor method for proper device set up;

in the SET BROADCAST RECEIVE mode said communications control processor method provides processing to configure the packet broadcast receiver address; Type 5 message packets are filtered according to the operator specified metropolitan region and regional zone whenever the traffic broadcast receive address is also selected by the device operator; said communications control processor method is informed of said SET BROADCAST RECEIVE mode of operation by said message processor method for proper device set up;

in the SEND/RECEIVE mode, said communications control processor method is notified by said message processor method as to the position of the AUTO/MANUAL mode switch located on said keyboard and display unit; the communications control processor method automatically releases responses to a Type 1 message if said AUTO/MANUAL mode switch is in the AUTO position, or by means of a release signal from said message processor method if said switch is in the MANUAL position; responses to all other message types, except Type 6 call signaling messages, are released by the communications control processor method only upon detection of the release signal by said message processor method; Type 6 messages are generated by said communications control processor method upon invocation by said message processor method to initiate call signaling method for establishment and tear-down of CDMA circuits.

6. A communications control processor method according to claim 5;

wherein said visual network access information in the form of an alphanumeric vehicle license plate number is received from the keyboard and display unit of a Sender device operating in said SEND/RECEIVE mode, by means of a message processor said method, identifying a Target device to which a digital information signal is addressed; wherein said communications control processor method is responsive to said visual network access information by creating a network address and providing to link control processor said method a data link address, for addressing of packet transmissions between said Sender device and said Target device, by performing binary encoding of the first six alphanumeric characters of the motor vehicle license plate number; the network address being represented using eight bit American Standard Code for Information Interchange, ASCII, encoding, resulting in forty-eight total network address bits; the data link media access control, MAC, address being represented using six bit Binary Coded Decimal Interchange Coding, BCDIC, encoding, with zero stuffing of high order bit positions resulting in forty-eight total MAC address bits;

wherein device initialization information in the form of an alpha-numeric vehicle license plate number of Sender vehicle is received from said keyboard and display unit, by means of said INITIALIZE mode of message processor said method, identifying said Sender device; wherein said communications control processor method is responsive to said initialization information by creating a network address and by providing to link control processor said method a data link address for said Sender device, to enable recognition of packet messages addressed to said Sender device, by performing binary encoding of the first six alpha-numeric characters of the motor vehicle license plate number; the network address being represented using eight bit American Standard Code for Information Interchange, ASCII, encoding, resulting in forty-eight total network address bits; the data link media access control, MAC, address being represented using six bit Binary Coded Decimal Interchange Coding, BCDIC, encoding, with zero stuffing of high order bit positions resulting in forty-eight total MAC address bits;

wherein said communications control processor method is responsive to any of a set of pseudo Target motor vehicle license plate numbers, received from said keyboard and display unit to initiate a broadcast, including CBROAD, EBROAD, GBROAD, and TBROAD, by providing to said link control processor method a network address and a data link address, for broadcast addressing from a single Sender to many Target devices, by performing binary encoding of the six characters of a pseudo Target motor vehicle license plate number to represent a common broadcast address; the network address being represented using eight bit American Standard Code for Information Interchange, ASCII, encoding, for forty-eight total network address bits; the data link MAC address being represented using six bit BCDIC encoding, with zero stuffing of high order bit positions, resulting in forty-eight total MAC address bits;

wherein said communications control processor method is responsive to said visual network access information by providing to said encryption unit means an encryption key for direct addressing of packet transmissions by using a predetermined number, n, of alpha-numeric characters in predetermined positions of a Target vehicle license plate number, each alpha-numeric character having 36 possibilities, to select, by one-to-one mapping, from a pre-stored table of $36^n$ unique keys contained within a periodically updated and distributed memory device, the encryption key to be used to send an encrypted message to a Target vehicle, and in the preferred approach using the same encryption key to receive a reply from the Target vehicle to minimize set-up delays; in particular, the Sender device always being assigned the encryption key belonging to the Target vehicle to both send and receive messages for that vehicle; in particular, the Target device always using its own encryption key while acting in the Target role for listening and responding to messages from the Sender;

wherein said communications control processor method is responsive to any of a set of pseudo license plate numbers, received from said keyboard and display unit to initiate a broadcast, including CBROAD, EBROAD, GBROAD, and TBROAD, by providing to said encryption unit means the encryption key for broadcast addressing by using a predetermined number of alpha-numeric characters, n, in predetermined positions of a pseudo Target vehicle license plate number representing the designated common broadcast address, to select, by one to one mapping, from a pre-stored table of $36^n$ unique keys contained within a periodically updated and distributed memory device, the encryption key to be used to send an encrypted broadcast message to all vehicles; and using the encryption key of the Sender vehicle, obtained by one-to-one mapping of a predetermined number, n, of alpha-numeric characters in predetermined positions of the Sender vehicle license plate number from a pre-stored table $36^n$ unique keys, to receive a reply from any of the vehicles responding to the broadcast message;

wherein said communications control processor method is responsive to said visual network access information by providing to said encryption unit means a common encryption key for establishment of full-duplex circuit communications between a Sender and Target device, by using a predetermined number, n, of alpha-numeric characters in predetermined positions of a Target vehicle license plate number, each alpha-numeric character having 36 possibilities, to select, by one-to-one mapping, from a pre-stored table of $36^n$ unique keys contained within a periodically updated and distributed memory device, and, by using a predetermined number, n, of alpha-numeric characters in predetermined positions of a Sender vehicle license plate number to select, by one-to-one mapping, a second encryption key to be modulo-two added to the first key, to yield a composite key which is thereupon divided by two to form the encryption session key to be used to establish the full-duplex CDMA communications circuit;

wherein said communications control processor method is responsive to said visual network access information by providing to said RF unit means a frequency channel to be used for direct addressing of packet transmissions by using a predetermined number, n, of alpha-numeric characters in predetermined positions of a Target vehicle license plate number to select, by one to one mapping from a pre-stored table of $36^n$ unique channels, the access channel frequency to be used to send a message to a Target vehicle; in the preferred approach the same frequency channel is used to receive a reply from the Target vehicle to minimize set-up delays;

wherein said communications control processor method is responsive to said visual network access information by providing to said RF unit means a frequency band to be used for establishment of CDMA communications circuits by using a predetermined number, n, of alpha-numeric characters in predetermined positions of a Target vehicle license plate number to select, by one to one mapping from a prestored table of $36^n$ unique channels, the frequency band to establish a simplex circuit to the Target vehicle; in the preferred approach the same frequency band is used to establish a second simplex circuit from the Target vehicle to the Sender device to minimize set-up delays;

wherein said communications control processor method is responsive to any of a set of pseudo Target vehicle license plate numbers, received from said keyboard and display unit for initiating a broadcast, including CBROAD, EBROAD, and GBROAD, by providing to said RF unit means a frequency channel to be used for broadcast addressing by using a predetermined number, n, of alpha-numeric characters in predetermined positions of a pseudo Target vehicle license plate number representing the designated common broadcast address, to select by one to one mapping from a pre-stored table of $36^n$ unique channels, the access channel frequency to be used to send a broadcast message to all vehicles; in the preferred approach the frequency channel of the Sender vehicle, obtained by the one-to-one mapping of a predetermined number, n, of alpha-numeric characters in predetermined positions of the Sender vehicle license plate number from a pre-stored table of channels, is used to receive a reply from any of the vehicles responding to the broadcast message;

wherein said communications control processor method is responsive to said visual network access information by providing to said digital CDMA modem means two CDMA codes to be used for the establishment of a full-duplex communications circuit between a Sender and Target device by using a predetermined number, n, of alpha-numeric characters in predetermined positions of a Target vehicle license plate number to select from a pre-stored table of $36^n$ unique codes, the code division multiple access code to be used for the forward simplex circuit to a Target vehicle and, by using a predetermined number, n, of alpha-numeric characters in predetermined positions of a Sender vehicle license plate number to select from a pre-stored table of $36^n$ unique codes, the code division multiple access code to be used for the reverse simplex circuit from a Target vehicle.

7. A communications control processor method, according to claim 5, wherein said call signaling method, for the establishment of CDMA circuit-based communications between a Sender and a Target device, further comprising a CIRCUIT SET-UP INITIATE/RESPOND mode process, a SEND/RECEIVE mode process, and a LISTEN/RESPOND mode process; at the invocation of said CIRCUIT SET-UP INITIATE mode process, said SEND/RECEIVE mode process is used by a Sender device to signal a request to a Target device, acting with said LISTEN/RESPOND mode process, for a circuit to be established; upon notification by said CIRCUIT SET-UP RESPOND mode process of the Target device, by means of said LISTEN/RESPOND mode process, that resources are available, a full-duplex secure CDMA circuit is established between the Sender and Target devices using two separate CDMA codes determined by mapping their respective alpha-numeric identifiers to a designated look-up table; subsequently, after communications have been completed and upon user action, said CIRCUIT SET-UP INITIATE/RESPOND mode process invokes said SEND/RECEIVE mode process for signaling by either device for termination of same CDMA circuit, upon which, said CDMA circuit is disengaged.

8. A device for two-way communications of digital information signals over an electromagnetic medium between geographically separate and distinct entities, each said entity being equipped with said device and identifiable by a unique alpha-numeric identifier; said device consisting of a man-machine interface means, a message processor means, a communications control processor means, and a transceiver means;

said man-machine interface means providing a mechanism for input of said alpha-numeric entity identifiers and information from said operator;

said man-machine interface means communicating with said message processor for transfer of said alpha-numeric entity identifiers and operator-entered information;

said message processor means providing a menu generation and control function for said man-machine interface means, and a function for formatting of said operator-entered information;

said message processor means interfaces with said communications control processor means for transfer of said alpha-numeric entity identifiers and said operator-entered information;

said communications control processor means providing a function for reformatting said operator-entered information received from said message processor means and said transceiver means, a function for identifying network communications parameter values from said alpha-numeric entity identifiers, and a function for configuring transceiver subsystems with said network communications parameter values;

said communications control processor means interfaces with said transceiver means for conveyance of said operator-entered message information and said network communications parameter values;

said transceiver means comprising a link control unit means, a digital modem unit means, and a radio frequency unit means to support electro-magnetic communications between devices.

9. A device according to claim 8, for the wireless encrypted transmission of digital information signals between a plurality of stations utilizing both carrier sense multiple access, CSMA, packet transmissions, and code division multiple access, CDMA, communications circuits, addressed by means of said visual network access method over selected radio frequency, RF, channels, comprising:

a keyboard and display unit means to permit entry by a device user of a visually sighted alpha-numeric identifier for a Target station, and for providing a man-machine interface to the message processor means for controlling initialization, mode of operation, message creation, message storage, and message review;

a message processor means for processing message inputs to and from said keyboard and display unit means, memory storage unit means, voice processing unit means and communications control processor means;

a memory storage unit means for non-volatile and volatile storage of messages and communications control parameters by said keyboard and display unit means, said message processor means, said voice processing unit means, and said communication control processor means;

a voice processing unit means for receiving an analog voice signal from a built-in microphone and a preamplifier within the device upon command from said message processor, performing an A-law analog-to-digital, A/D, conversion of the analog voice signal, and compressing the digital voice signal output from the conversion using a speech compression algorithm, forwarding result to said memory storage unit means and signalling said communications control processor means of availability of compressed digital voice signal for building an outbound message frame; compressed voice messages received by said communications control processor means in inbound message frames are forwarded to said memory storage unit means by said communications control processor means followed by a signal to said voice processing unit means which then employs a speech compression algorithm to expand the digital signal, followed by an A-law digital-to-analog, D/A conversion to produce an analog voice output which is routed to a loudspeaker means via an amplifier means;

an encryption unit means for encrypting message segments upon receipt of plain text message segments and an encryption key from said communications control processor means, and forwarding the encrypted communications to said communications control processor means; and for receiving encrypted message segments and an encryption key from said communications control processor means, decrypting these segments, and forwarding the decrypted segments back to said communications control processor means;

a link control unit means, consisting of a logical link control/media access control, LLC/MAC, link control processor, and a synchronous data link control, SDLC, link control processor; said LLC/MAC link control processor means for receiving message blocks for packet transmission from said communications control processor together with address and message type, and forwarding data link frames to the digital phase shift keying, PSK, modem; and for receiving data link frames from said digital PSK modem and forwarding message blocks to said communications control processor means: said LLC/MAC link control processor means evaluates the level of activity on the transmission channel, by monitoring said digital demodulator output level, to provide channel access control via signal sent to digital PSK modem; said SDLC, link control processor means for receiving a message stream for synchronous CDMA transmission from said communications control processor means, and forwarding modified High Level Data Link Control, HDLC, data link frames to the digital CDMA modem; and for receiving modified HDLC data link frames from said digital CDMA modem and forwarding a message stream to said communications control processor means;

a digital modem unit means, consisting of a digital PSK modem, and a digital CDMA modem; said digital PSK modem means for receiving digital messages from said LLC/MAC link control processor means and, upon command by said link control processor means, modulating the bit stream in accordance with a phase-shift keying scheme and forwarding the output to the RF unit; and for receiving a phase-shift keyed waveform from said RF unit, demodulating the waveform into a digital bit stream, and forwarding the result to said LLC/MAC link control processor means; said digital CDMA modem means for receiving transmit and receive CDMA code addresses from said communications control processor means, and digital messages from said SDLC link control processor and, upon command by said communications control processor means, CDMA encoding the digital message and modulating the encoded bit stream in accordance with a phase-shift keying scheme and forwarding the output to said RF unit means; and for receiving a phase-shift keyed CDMA waveform from said RF unit means, demodulating the waveform into a digital bit stream, CDMA decoding the digital bit stream, and forwarding the result to said SDLC link control processor;

a radio frequency unit means, consisting of a narrowband transmitter/receiver, an auxilliary narrowband receiver, and a wideband CDMA transmitter/receiver; said narrowband transmitter/receiver for receiving both transmit and receive frequency channel information from said communications control processor means, and transmit channel access control information from said LLC/MAC link control processor means, upconverting a phase-shift keyed modulated waveform received from said digital PSK modem, upon command by modem, from an intermediate frequency to an RF microwave frequency channel as specified by said communications control processor means, amplifying the resultant waveform which is fed to an antenna; and for receiving a narrowband RF microwave input signal, on a frequency channel as specified by said communications control processor, from an antenna, amplifying the signal, downconverting the signal from RF to IF, and feeding the resultant signal to said digital PSK modem; said auxilliary narrowband receiver with an identical receiver mechanism for receipt of broadcast messages; said wideband CDMA transmitter/receiver for receiving both transmit and receive frequency band information, and transmit channel access control information, from said communications control processor means, upconverting a phase-shift keyed modulated waveform received from said digital CDMA modem, upon command by modem, from an intermediate frequency to an RF microwave frequency band as specified by said communications control processor means, amplifying the resultant waveform which is fed to an antenna; and for receiving a wideband RF microwave input signal from an antenna, on a frequency band as specified by said communications control processor means, amplifying signal, downconverting signal from RF to IF, and feeding the resultant signal to said digital CDMA modem;

a communications control processor means for using data elements obtained from said memory storage unit means, upon signalling by said message processor means to build messages and, by using visual network access and broadcast address information received from device user via said message processor means, to specify the packet network addresses, and the packet link addresses for said link control unit, the direct session keys, for packet or circuit usage, and broadcast session keys for said encryption unit means, the code division multiple access CDMA codes for said digital CDMA modem, and the direct and broadcast frequency channels for said RF unit means; said communications control processor means segments outgoing plain text messages, forwards these to said encryption unit means, receives the encrypted segments back from said encryption unit means and reassembles the segments into the final encrypted message frame which the processor delivers to said link control unit means; said communications control processor means segments incoming encrypted messages received from said link control unit means, forwards the segments to said encryption unit means, receives the decrypted segments back from said encryption unit means and reassembles the segments into the final decrypted message which said communications control processor means delivers to said message processor means via said memory storage unit means; and a power supply means for supplying power to said keyboard and display unit means, said memory storage unit means, said voice processing unit means, said message processor means, said communications control processor means, said encryption unit means, said link control unit means, said digital modem unit means, and said RF unit means.

10. A device according to claim 9, wherein said link control unit means further comprises: a means for receipt of message blocks, address and message type information from said communications control processor; a means for formatting outbound message blocks into Logical Link Control, LLC, frames; a means for stuffing SSAP field of LLC frame with zero bits; a means for storing LLC frames in an outbound service queue in accordance with message type; a means for implementing message flow control and error control in accordance with a Logical Link Control protocol; a means for transferring LLC frames from outbound service queue; a means for assembling LLC frames into MAC frames; a means for storing outbound MAC frames in outbound MAC queue; a means for implementing a media access control protocol; a means for monitoring transmission channel; a means for providing channel access control; a means for forwarding MAC frames from MAC queue to digital modulator input;

a means for MAC link control processing in which MAC flames are received from said digital demodulator output; a means for implementing the media access control protocol; a means for disassembling MAC frames; a means for performing address checking; a means for performing cyclical redundancy code check on received message; a means for storing error free inbound MAC frames having correct destination address; a means for dropping inbound MAC frames having errors or incorrect destination address; means for reading message type; a means for storing LLC frames in inbound message queue in accordance with message type; a means for implementing flow control and error control in accordance with the Logical Link Control protocol; a means for forwarding LLC frames to said communications control processor.

11. A device according to claim 9, wherein said message processor means further comprises: a means for creation of a menu driven user interface on the display screen of said keyboard and display unit to enable device mode control; a means for providing device operation in an INITIALIZE mode to enable preliminary device configuration information to be entered by a device user; a means for providing device operation in a SEND/RECEIVE mode for menu generation, message formatting, and exchange of information; a means for providing device operation in a LISTEN/RESPOND mode for menu generation, message formatting, and exchange of information; a means for providing device operation in a SET-UP CIRCUIT INITIATE/RESPOND mode for establishment of a full duplex communications circuit with a Target device; a means for providing device operation in a SET-UP BROADCAST RECEIVER mode for configuration of an auxiliary receiver by a device user to receive broadcast messages of a user-selected category; a means for providing device operation in a PRE-STORE MESSAGES mode to enable messages to be developed by a device user and stored for later use; a means for providing device operation in a MESSAGE REVIEW mode to store received messages and to enable a device user to review stored messages;

a means for message processing in which a menu driven user interface is created on the display screen of said keyboard and display unit to provide for message composition and transfer; a means for composition and transfer of Type 1 packet messages to enable a device user to exchange telephone numbers with a Target device; a means for composition and transfer of Type 2 packet messages to enable a device user to exchange personal data messages with a Target device; a means for composition and transfer of Type 3 packet messages to enable a device user to exchange travel directions messages with a Target device; a means for composition and transfer of Type 4 packet messages to enable a device user to exchange voice messages with a Target device; a means for receipt of Type 5 packet messages to enable a device user to receive packetized traffic reports from a central broadcast terminal; a means for initiation and transfer of Type 6 packet messages to enable a device user to initiate call signaling for establishment and tear-down of full-duplex CDMA circuits.

12. A device according to claim 2, having an auxilliary receiver means to enable the receipt of broadcast traffic report message packets which are tagged by metropolitan region and regional zone, and a communications control processing means to provide filtering of such messages in accordance with the metropolitan region and regional zone as set by the device user via said keyboard and display unit.

13. A device according to claim 9, wherein the communications control processor means further comprises: means for coordination with said message processor means, said memory storage unit means, said encryption unit means, said link control unit means, said digital modem unit means, and said RF unit means; a means for providing communications control in an INITIALIZE mode to enable preliminary device communications parameter configuration information to be established; a means for providing communications control in a SEND/RECEIVE mode for information processing and exchange; a means for providing communications control in a LISTEN/RESPOND mode for information processing and exchange; a means for providing communications control in a SET-UP CIRCUIT INITIATE/RESPOND mode for establishment of a full-duplex communications circuit with a Target device; a means for providing communications control in a SET-UP BROADCAST RECEIVER mode for configuration of an auxiliary receiver for receipt of broadcast messages of a user-selected category;

a means for communications control processing in which Type 1 packet messages enabling a device user to exchange telephone numbers with a Target device, Type 2 packet messages enabling a device user to exchange personal data messages with a Target device, Type 3 packet messages enabling a device user to exchange travel directions messages with a Target device, and Type 4 packet messages enabling a device user to exchange voice messages with a Target device are transferred to and from said message processor means; and in which Type 5 packet messages enabling a device user to receive packetized traffic reports from a central broadcast terminal are transferred to said message processor means; a means for initiation and transfer of Type 6 packet messages to provide call signaling for establishment and tear-down of full-duplex CDMA circuits through coordination with said message processor means.

14. A call signaling method for a hybrid CSMA/spread spectrum wireless network for the establishment and tearing down of full-duplex spread spectrum circuits between a Sender and a Target station comprising the following method steps:

said Sender station sending a call request message packet to said Target station using CSMA protocol to request establishment of a full-duplex spread spectrum circuit;

said Target station processing said call request message packet and determining the availability of spread spectrum resources;

said Target station sending a call request response packet to said Sender station with information regarding the availability of spread spectrum resources, and if available, notifying said Sender station to initiate spread spectrum acquisition sequence;

said Sender station and said Target station each independently initiating a forward half-duplex spread spectrum acquisition sequence to the other, and independently synchronizing to a reverse half-duplex spread spectrum acquisition sequence from the other;

said Sender station and said Target station notifying each other using a CSMA message packet when synchronization to said reverse half-duplex spread spectrum sequence has completed;

said Sender station and said Target station commencing use of full-duplex spread spectrum circuit upon acquisition of said half-duplex reverse spread spectrum circuit from the other and notification from the other that acquisition of said forward half-duplex spread spectrum circuit has completed;

said Sender station and said Target station using CSMA message packet to notify the other if a transmission error has occurred for tear-down of said full-duplex spread spectrum circuit;

said Sender station and said Target station using CSMA message packet to notify the other when transmission has completed for tear-down of said full-duplex spread spectrum circuit.

15. A network access method for sending a message to a target entity, the target entity having a target identifier, the method comprising the steps of:

decoding at least one communication parameter encoded in the target identifier;

formatting the message;

setting at least one of a frequency band, a frequency channel, an encryption key, and a spread-spectrum code of a communication subsystem according to the at least one decoded communication parameter; and sending the formatted message to the target entity.

16. The method as recited in claim 15, wherein the step of decoding the at least one communication parameter includes:

accessing a lookup table based on a value of a character in a specified location in the target identifier.

17. A data communications device for sending a message to a target entity, the target entity having a target identifier, comprising:

means for receiving the target identifier assigned to the target entity;

means, coupled to the receiving means, for decoding at least one communication parameter encoded in the target identifier;

means for formatting the message;

means for setting at least one of a frequency band, a frequency channel, an encryption key, and a spread-spectrum code of a communication subsystem according to the at least one decoded communication parameter; and means for sending the formatted message to the target entity.

18. The data communication device as recited in claim 17, wherein the decoding means comprises means for storing at least one communication parameter according to a value of a character in a specified location in the target identifier.

19. A data communications device for sending a message to a target entity where the target entity has a target identifier, the device comprising:

a keyboard and display unit which receives the target identifier;

a memory coupled to the keyboard and display unit which stores at least one communication parameter;

a message processor coupled to the memory and the keyboard and display unit which composes the message;

a communications control processor coupled to the message processor and the memory which decodes at least one target communication parameter encoded in the target identifier and which sets at least one of a frequency band, a frequency channel, an encryption key, and a spread-spectrum code of the data communications device according to the at least one decoded target communication parameter;

a link control unit coupled to the communications control processor which provides media access control addressing for the composed message; and a transceiver subsystem coupled to the link control unit and the communications control processor which transmits the composed message with the provided media access control addressing.

20. The data communication device as recited in claim 19 wherein the memory comprises a Read Only Memory which stores the at least one communication parameter.

* * * * *